United States Patent
He et al.

(10) Patent No.: US 12,176,702 B2
(45) Date of Patent: Dec. 24, 2024

(54) ALTERNATING CURRENT TRANSMISSION CIRCUIT AND SOCKET

(71) Applicant: Shenzhen Baseus Technology Co., Ltd, Shenzhen (CN)

(72) Inventors: Shiyou He, Shenzhen (CN); Longkou Chen, Shenzhen (CN); Dengyu Gui, Shenzhen (CN)

(73) Assignee: Shenzhen Baseus Technology Co., Ltd, Shenzhen (CN)

( * ) Notice: Subject to any disclaimer, the term of this patent is extended or adjusted under 35 U.S.C. 154(b) by 386 days.

(21) Appl. No.: 17/702,811

(22) Filed: Mar. 24, 2022

(65) Prior Publication Data
US 2023/0138316 A1 May 4, 2023

(30) Foreign Application Priority Data

| Oct. 29, 2021 | (CN) | 202122635077.4 |
| Oct. 29, 2021 | (CN) | 202122635624.9 |
| Nov. 6, 2021 | (CN) | 202122719481.X |
| Dec. 23, 2021 | (CN) | 202111593751.5 |
| Dec. 23, 2021 | (CN) | 202123278188.0 |

(51) Int. Cl.
*H02H 7/00* (2006.01)
*H02H 1/00* (2006.01)
*H02H 7/20* (2006.01)

(52) U.S. Cl.
CPC ............ *H02H 7/20* (2013.01); *H02H 1/0007* (2013.01)

(58) Field of Classification Search
None
See application file for complete search history.

(56) References Cited

U.S. PATENT DOCUMENTS

| 10,485,082 B2* | 11/2019 | John | H05B 47/22 |
| 2002/0131283 A1* | 9/2002 | Preller | H02M 3/33507 363/97 |
| 2007/0025044 A1* | 2/2007 | Golubovic | H01C 7/102 361/124 |
| 2014/0254057 A1* | 9/2014 | Chen | H02H 9/08 361/118 |

FOREIGN PATENT DOCUMENTS

| CN | 202014003 U | 10/2011 |
| CN | 103138244 A | 6/2013 |
| CN | 204576133 U | 8/2015 |

* cited by examiner

*Primary Examiner* — Stephen W Jackson
(74) *Attorney, Agent, or Firm* — Andrew C. Cheng

(57) ABSTRACT

The present disclosure relates to electronic equipment, and especially relates to an alternating current transmission circuit. The alternating current transmission circuit includes power supply circuit and a switch circuit coupled with the power supply circuit. The switch circuit includes a main control circuit, a surge detection circuit, and a first switch device connected in series in the power supply circuit. The main control circuit is signal connected with the first switch device and configured to control on-off of the power supply circuit by controlling the first switch device. An input terminal of the surge detection circuit is connected with the power supply circuit, and an output terminal of the surge detection circuit is connected with the main control circuit.

17 Claims, 31 Drawing Sheets

ALTERNATING CURRENT TRANSMISSION CIRCUIT AND SOCKET

CROSS-REFERENCE TO RELATED APPLICATIONS

The application claims priority of 202122635624.9, filed on Oct. 29, 2021; 202122635077.4, filed on Oct. 29, 2021; 202122719481.X, filed on Nov. 6, 2021; 202111593751.5, Dec. 23, 2021; 202123278188.0 Dec. 23, 2021; which is incorporated herein by reference in its entireties.

FIELD

The subject matter herein generally relates to electronic devices, and particularly relates to an alternating current transmission circuit and a socket.

BACKGROUND

An Alternating current (AC) transmission circuit is widely used in people's daily life. In order to facilitate control, an AC transmission circuit with a switching device is developed. However, the switching device will have a problem of zero crossing shutdown, which will lead to sudden change of the current at an output terminal of the AC transmission circuit, and then produce a peak voltage in electrical equipment electrically connected with the output terminal of the AC transmission circuit. Therefore, it is easy to damage the switching device and even lead to potential safety hazards.

SUMMARY

In order to solve above-mentioned technology problems of sudden change of the current when the switching device of AC transmission circuit is turned off at zero crossing in existing technologies, the present disclosure provides an AC transmission circuit and a socket.

A solution to solve the technological problems of the present disclosure is to provide an alternating current transmission circuit. The alternating current transmission circuit includes a power supply circuit; and a switch circuit coupled with the power supply circuit. The switch circuit includes a main control circuit, a surge detection circuit, and a first switch device connected in series in the power supply circuit. The main control circuit is signal connected with the first switch device and configured to control on-off of the power supply circuit by controlling the first switch device. An input terminal of the surge detection circuit is connected with the power supply circuit, and an output terminal of the surge detection circuit is connected with the main control circuit.

Preferably, the surge detection circuit includes a varistor, the varistor is connected to the power supply circuit and the main control circuit.

Preferably, the switch circuit further includes an AC voltage detection circuit, the AC voltage detection circuit is connected to the power supply circuit and configured to detect voltages of the power supply circuit, an output terminal of the AC voltage detection circuit is connected with the main control circuit.

Preferably, input voltage of the power supply circuit is lower than a present voltage threshold, the main control circuit controls the first switch device to be turned on.

Preferably, the first switch device includes a TRIAC, the switch circuit further includes a switch isolation control circuit, the TRIAC is connected with the main control circuit through the switch isolation control circuit.

Preferably, the switch isolation control circuit includes an optocoupler.

Preferably, the first switch device is a TRIAC, the main control circuit is signal connected with the first switch device and configured to control on-off of the power supply circuit through the first switch device. The switch circuit further includes a temperature detection circuit connected with the main control circuit and configured to detect temperature of the alternating current transmission circuit.

Preferably, the temperature detection circuit configured to detect temperature of the TRIAC and feed back the detected temperature to the main control circuit, the main control circuit controls on-off of the TRIAC according to the detected temperature.

Preferably, the main control circuit stores preset an overheat threshold, when the detected temperature is beyond the overheat threshold, the main control circuit controls the TRIAC to be turned off.

Preferably, the switch circuit further includes a switch control circuit, the switch control circuit controls on-off of the TRIAC through the main control circuit, the switch control circuit is one or more of a touch switch, a voice switch, a remote control switch or a push switch.

Preferably, the switch circuit further includes a display circuit connected with the main control circuit.

Another solution to solve the technological problems of the present disclosure is to provide an alternating current transmission circuit, which includes a power supply circuit; and a switch circuit coupled with the power supply circuit. The switch circuit includes a main control circuit, a first switch device connected in series in the power supply circuit, and a snubber circuit connected in parallel with the first switch circuit. The main control circuit controls on-off of the power supply circuit by controlling on-off of the first switch device. The snubber circuit is configured to compensate current of the power supply circuit when the first switch device is turns off at zero-crossing.

Preferably, the first switch device is one or more of a TRIAC, a relay, and a MOS transistor.

Preferably, the snubber circuit includes a second switch device, one terminal of the second switch device is connected with the main control circuit, the other terminal of the second switch device is connected with the power supply circuit.

Preferably, the second switch device includes a relay and a MOS transistor, the main control circuit is connected with the relay through the MOS transistor and controls on-off of the relay by controlling the MOS transistor.

Preferably, the alternating current transition circuit further includes a voltage detection circuit configured to detect alternating current voltages and phases at an input terminal of the power supply circuit, an input terminal of the voltage detection circuit is connected with the power supply circuit, an output terminal of the voltage detection circuit is connected with the main control circuit.

Preferably, the voltage detection circuit includes a transformer and a full bridge MOS circuit, a primary coil of the transformer is connected with the power supply circuit, a secondary coil of the transformer is connected with the main control circuit through the full bridge MOS circuit.

Preferably, the switch circuit further includes a voltage-stabilizing circuit, an input terminal of the voltage-stabilizing circuit is connected with the power supply circuit, an output terminal of the voltage-stabilizing circuit is connected with the main control circuit and the snubber circuit.

Still another solution to solve the technological problems of the present disclosure is to provide a socket, which includes a socket body and a circuit structure arranged in the socket body. The circuit structure is the alternating current transmission circuit described above.

Comparing to the existing technologies, the alternating current transmission circuit provided by the present disclosure has following advantages:

In the AC transmission circuit provided by the embodiments of the present disclosure, the switching circuit includes a main control circuit, a surge detection circuit and a first switching device connected in series to the power supply circuit. The main control circuit is signal connected with the first switching device and controls the on-off of the power supply circuit through the first switching device. Through the design of coupling the first switching device to the power supply circuit, the problem of easy ignition at the switch in the AC transmission circuit is effectively avoided, so as to improve safety and reliability of the AC transmission circuit. In addition, the design of controlling the on-off of the AC transmission circuit through the first switching device makes the service life of the switching circuit in the AC transmission circuit longer, so as to prolong the service life of the switching circuit of the AC transmission circuit. In addition, the switching circuit further includes the surge detection circuit, which can detect the high-voltage surge, lightning stroke and other abnormalities inputted by the power supply circuit. First, it can prevent internal components from being damaged by abnormal external voltage, so as to ensure the normal operation of the AC transmission circuit. Second, it can electrically isolate the power supply circuit and the switching circuit through the transformer, Thus, safety of the AC transmission circuit is improved.

In the AC transmission circuit provided by the embodiments of the present disclosure, the surge detection circuit includes a varistor. When the power supply circuit inputs high voltages, the varistor is conducted. The main control circuit determines whether there is a high voltage is inputted by detecting whether the varistor is conducted. Therefore, the main control circuit can accurately detect the voltage in the power supply circuit, and timely controls on-off of the first switch device so as to control on-off of the power supply circuit according to the voltage in the power supply circuit, thereby protecting the AC transmission circuit from voltage surges.

In the AC transmission circuit provided by the embodiments of the present disclosure, the AC voltage detection circuit can detect the voltage inputted by the power supply circuit. Furthermore, when the AC voltage detection circuit detects that the voltage inputted by the power supply circuit is within the present voltage threshold, the main control circuit controls on-off of the first switch device so as to ensure normal power supply of the power supply circuit. When the main control circuit determines that the AC voltage detection circuit detects that the voltage inputted by the power supply circuit is beyond the preset voltage threshold (that is, the voltage inputted by the power supply circuit is abnormal), the main control circuit controls the first switch device to be turned off, so as to control the power supply circuit to stop power supply. By the main control circuit and the AC voltage detection circuit, it further ensures safety and reliability of the AC transmission circuit.

In the AC transmission circuit provided by the embodiments of the present disclosure, the first switch device includes the TRIAC. The switch circuit further includes the switch isolation control circuit, and the TRIAC is connected to the main control circuit through the switch isolation control circuit. The switch isolation control circuit can electrically isolate the power supply circuit and the main control circuit, which can protect the main control circuit from being damaged due to voltage surges in the power supply circuit, so as to prolong service life of the AC transmission circuit. Furthermore, the design that the power supply circuit and the main control circuit are electrically isolated can prevent direct connection between the high voltage and the main control circuit, so as to further improve safety when users control on-off of the AC transmission circuit artificially. Furthermore, the design that the switch isolation control circuit includes the optocoupler further ensures reliable isolation control of the TRIAC by the main control circuit, so as to improve safety and reliability of the main control circuit.

In the AC transmission circuit provided by the embodiments of the present disclosure, the first switch device is the TRIAC. The main control circuit is signal connected with the TRIAC and configured to control on-off of the power supply circuit by the TRIAC. By the design that the TRIAC is coupled to the power supply circuit, it can effectively avoid ignition at the switch device in the AC transmission circuit. Therefore, it can improve safety and reliability of the AC transmission circuit. Additionally, by the design that the TRIAC controls on-off the AC transmission circuit, it can make service life of the switch circuit of the AC transmission device longer, thereby prolonging service life of the switch circuit of the AC transmission device. Furthermore, the AC transmission circuit further includes the temperature detection circuit. The temperature detection circuit can detect temperature of the AC transmission circuit and feeds back detected temperature to the main control circuit so as to control on-off of the power supply circuit. Furthermore, by presetting an overheat temperature threshold of the TRIAC in advance, when the main control circuit determines that the temperature of the TRIAC detected by the temperature detection circuit is beyond the overheat temperature threshold, it means that the temperature of the TRIAC is too high and the AC transmission circuit is abnormal at this time. Then, the main control circuit controls the power supply circuit to stop power supply. By arrangement of the main control circuit and the temperature detection circuit, it further ensures safety and reliability of the AC transmission circuit.

In the AC transmission circuit provided by the embodiments of the present disclosure, the switch control circuit facilitates convenient control of the on-off of the AC transmission circuit for users. The switch control circuit can be a touch switch, a voice switch, a remote-control switch or a push switch, which makes use of the AC transmission circuit more intelligent, thereby improving convenience of the AC transmission circuit. If the switch control circuit is a push switch, it may be cost saving.

In the AC transmission circuit provided by the embodiments of the present disclosure, the display circuit can visually show working information of the AC transmission circuit, which further improve convenience of the AC transmission circuit.

The AC transmission circuit provided by the embodiments of the present disclosure, includes the power supply circuit and the switch circuit coupled with the power supply circuit. The switch circuit further includes the main control circuit and the first switch device coupled to the power supply circuit. The main control circuit is signal connected with the first switch device and configured to control on-off of the power supply circuit through the first switch device. The design that the main control circuit controls on-off of the power supply circuit through the first switch device can allow users to control on-off of the power supply circuit according to actual need. Furthermore, the switch circuit further includes a snubber circuit connected in parallel with the first switch device. When the first switch device turns off at zero-crossing, the snubber circuit is configured to compensate for current of the power supply circuit. That is, when the first switch device turns off at zero-crossing, the snubber circuit is conducted to allow current pass therethrough so as to prevent sudden change of the current at the output terminal of the power supply circuit, which can avoid voltage surges in the electric appliance connected to the power supply circuit due to sudden change of the current at the output terminal of the power supply circuit. By the design that the first switch device is connected in parallel with the snubber circuit, when the first switch device turns off at zero-crossing, it can avoid voltage surges due to sudden change of the current in the AC transmission circuit so as to make the AC transmission circuit output complete wave diagram.

In the AC transmission circuit provided by the embodiments of the present disclosure, the first switch device is one or more of a TRIAC, a relay or a MOS transistor. The design setting the first switching device as a semiconductor switch that is not physically opened and closed, a problem prone to ignite along on/off of a physical switch can be effectively avoided, so as to improve safety and reliability of the AC transmission circuit. Therefore, service life of the switching circuit in the AC transmission circuit is longer, and the safety of the power supply circuit in the AC transmission circuit is improved.

In the AC transmission circuit provided by the embodiments of the present disclosure, the second switch circuit includes a second switch device. One end of the second switch device is connected with the main control circuit, and the other end of the second switch device is connected with the power supply circuit. The snubber circuit can be controlled to be conducted through the second switch device and then to compensate for the current of the power supply circuit.

In the AC transmission circuit provided by the embodiments of the present disclosure, the second switch device includes the relay and the MOS transistor. The main control circuit is connected with the relay through the MOS transistor and configured to control on-off of the relay by controlling the MOS transistor, which can improve response speed of the second switch device. When the first switch device is turned off at zero-crossing, the main control circuit controls the snubber circuit is conducted by the MOS transistor and the relay so as to control the snubber circuit to timely compensate the current of the power supply circuit. Furthermore, the relay in the snubber circuit can make the snubber circuit electrically isolate the power supply circuit and the main control circuit, so as to effectively protect the main control circuit from being damaged due to high voltages in the power supply circuit, Therefore, it can further improve safety and reliability of the AC transmission circuit.

The AC transmission circuit provided by the embodiments of the present disclosure further includes a voltage detection circuit, which detects the AC voltages and phases at the input terminal of the power supply circuit. The input terminal of the voltage detection circuit is connected with the power supply circuit, and the output end of the voltage detection circuit is connected with the main control circuit. The voltage detection circuit can more accurately detect the voltages and phases of the voltage of the AC power supply inputted by the power supply circuit, and can more timely and accurately detect the positive and negative peaks of the voltage of the power supply circuit, so as to reduce the difference between the detected voltage of the voltage detection circuit and the actual voltage. Furthermore, it can more accurately detect the AC voltage inputted by the AC transmission circuit, so that the main control circuit can control the switching circuit in time according to the input voltage of the power supply circuit. In addition, by more accurately detecting the voltage and phase of the AC inputted by the AC transmission current, the connection of the snubber circuit can be controlled in time to ensure that the snubber circuit can compensate the current in time. That is, the voltage detection circuit further avoids possibility of sudden change of current in the power supply circuit, and can further ensure the safety and reliability of AC transmission circuit.

In the AC transmission circuit provided by the embodiments of the present disclosure, the voltage detection circuit includes a transformer and a full bridge MOS circuit. The primary coil of the transformer is connected with the power supply circuit, and the secondary coil of the transformer is connected with the main control circuit through the full bridge MOS circuit. When the power supply circuit inputs high voltages, the voltage of the primary coil of the transformer increase. At this time, the voltages of the secondary coil of the transformer decrease. The transformer can electrically isolate the power supply circuit and the switch circuit. Furthermore, the secondary coil of the transformer is connected with the main control circuit through the full bridge MOS circuit. The full bridge MOS circuit can detect and switch the alternating current inputted by the power supply circuit, can sort out positive peaks and negative peaks of the alternating current, and can provides voltage signals for detection of voltages and phases. The voltage drop detected by the full bridge MOS circuit is smaller, which can further improve accuracy of voltage detection. In addition, the full bridge MOS circuit is used to detect the voltage, which improves accuracy of the voltage detection circuit, and further ensures the safety and reliability of the AC transmission circuit.

The AC transmission circuit provided by the embodiments of the present disclosure includes a voltage-stabilizing circuit. An input terminal of the voltage-stabilizing circuit is connected with the power supply circuit, and an output terminal of the voltage-stabilizing circuit is connected to the main control circuit and the snubber circuit. Through the design that the switch circuit includes the voltage-stabilizing circuit, the voltage-stabilizing circuit provides power to the main control circuit and the snubber circuit.

The socket provided by the embodiments of the present disclosure have same advantages with the AC transmission circuit, which is not repeated here.

Figure 1:
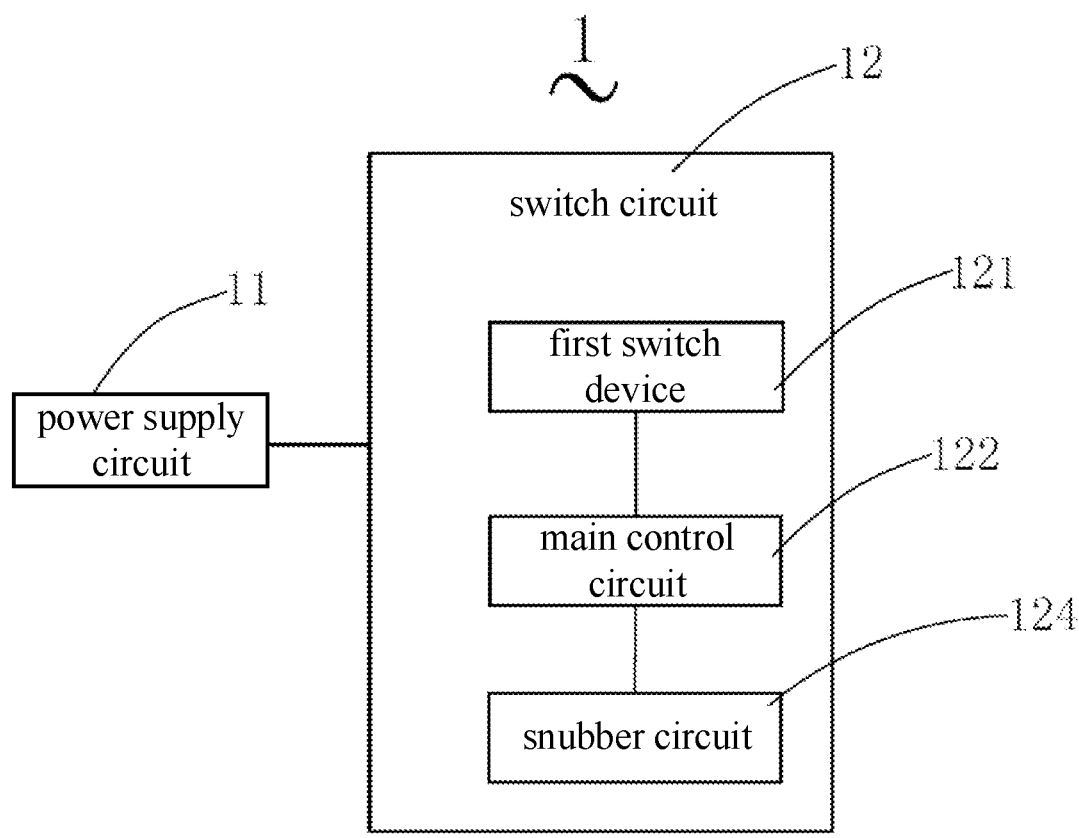
FIG. 1 is a schematic view of a first circuit module of an alternating current (AC) transmission circuit according to a first embodiment of the present disclosure.

IN THE DRAWINGS 1. alternating current transmission circuit; 2. alternating current transmission circuit; 3. alternating current transmission circuit; 4. socket;
11. power supply circuit; 12. switch circuit; 13. voltage detection circuit; 20. power supply circuit; 21. switch circuit; 31. power supply circuit; 32. switch circuit; 41. socket body; 42. circuit structure;
121. first switch device; 122. main control circuit; 123. voltage-stabilizing circuit; 124. buffer circuit; 125. switch isolation control circuit; 211. main control circuit; 212. first switch device; 213. surge detection circuit; 214. AC voltage detection circuit; 215. warning circuit; 216. temperature detection circuit; 217. switch isolation control circuit; 218. voltage-stabilizing circuit; 321. switch control circuit; 322. main control circuit; 323. TRIAC; 324. switch isolation control circuit; 325. display circuit; 326. rectifier circuit; 327. temperature detection circuit; 328. warning circuit;
1241. second switch device; 1211. TRIAC

DETAILED DESCRIPTION

In order for making objects, technical solutions and advantages of the present disclosure clearer, the present disclosure is further described in detail below in combination with the attached drawings and exemplary embodiments. It should be understood that the exemplary embodiments described herein are only used to explain the present disclosure and are not used to limit the present disclosure.

Figure 2:
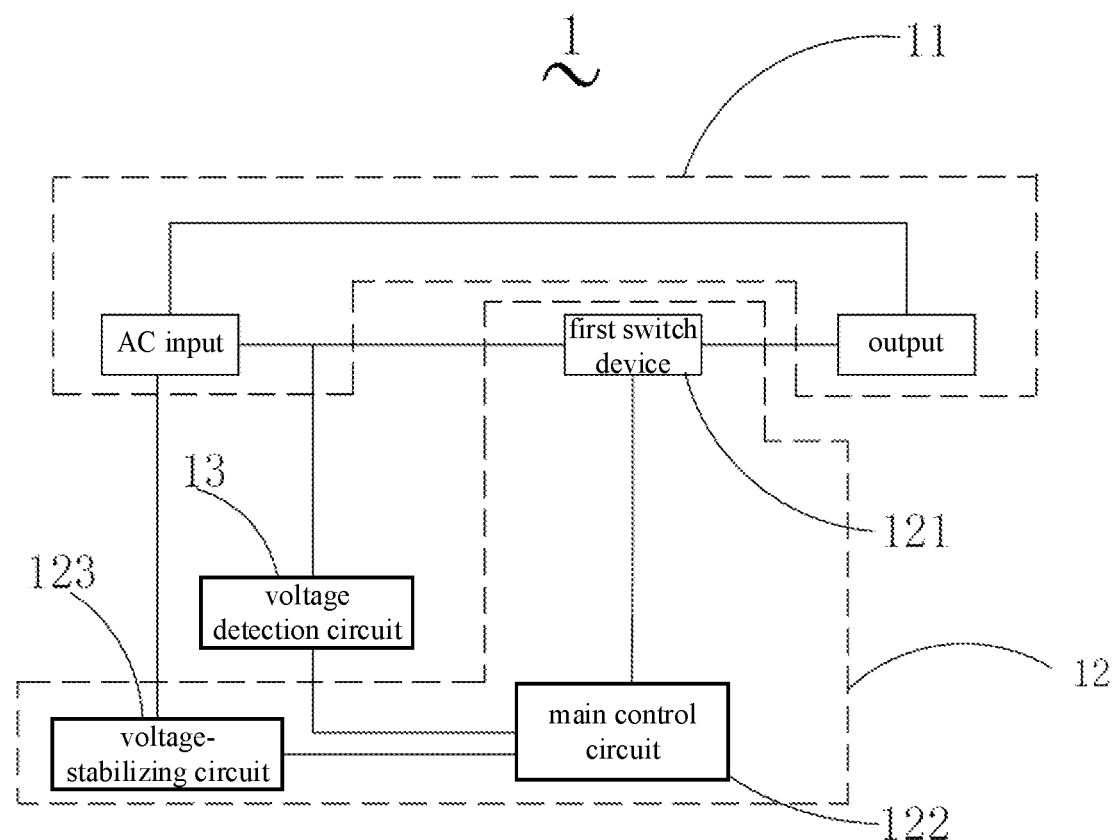
FIG. 2 is a schematic view of a second circuit module of the AC transmission circuit according to the first embodiment of the present disclosure.

Referring to FIGS. 1 and 2, a first embodiment of the present disclosure provides an AC transmission circuit 1. The AC transmission circuit 1 includes a power supply circuit 11 and a switch circuit 12 coupled with the power supply circuit 11. The switch circuit 12 includes a main control circuit 122, a first switch device 121 connected in series to the power supply circuit 11, and a snubber circuit 124 connected in parallel to the first switch device 121. The main control circuit 122 The main control circuit 122 controls on-off of the power supply circuit 11 by controlling on-off of the first switching device 121. When the first switching device 121 turns off at zero-crossing, the snubber circuit 124 compensates current of the power supply circuit 11.

Figure 5:
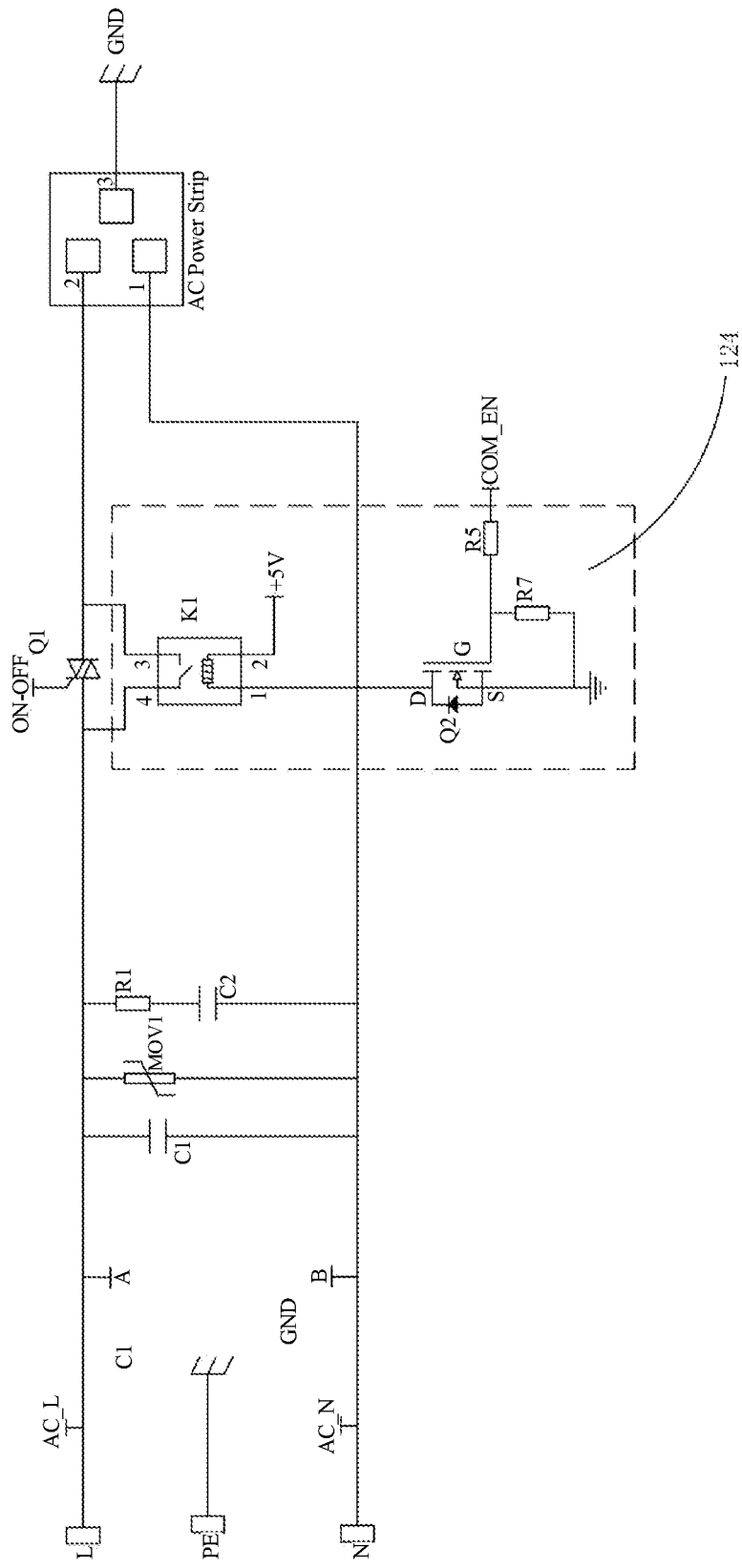
FIG. 5 is a schematic view showing principle of a voltage-stabilizing circuit of the AC transmission circuit according to the first embodiment.

Additionally, Referring to FIGS. 2 and 5, the switch circuit 12 provided by the first embodiment of the present disclosure further includes a voltage-stabilizing circuit 123. An input terminal of the voltage-stabilizing circuit 123 is connected to the power supply circuit 11, an output terminal of the voltage-stabilizing circuit 123 are connected to both the main control circuit 122 and the snubber circuit 124.

It should be understood, part of alternating current of the power supply circuit 11 provided by the first embodiment of the present disclosure is transmitted to the voltage-stabilizing circuit 123, and the other part of alternating current of the power supply circuit 11 supplies power to electrical equipment electrically connected to an output terminal of the power supply circuit 11 through the output terminal. The voltage stabilizing circuit 123 supplies power to the main control circuit 122 and the snubber circuit 124.

The voltage stabilizing circuit 123 of the present disclosure can be an input circuit connected to a primary input terminal, and the input circuit includes an AC input, a primary rectifier and a primary filter connected successively. Then, the primary input power supply is provided to the voltage stabilizing circuit 123, a load to be charged is connected to a secondary output terminal, and the secondary output terminal provides charging power supply to the load.

Figure 3:
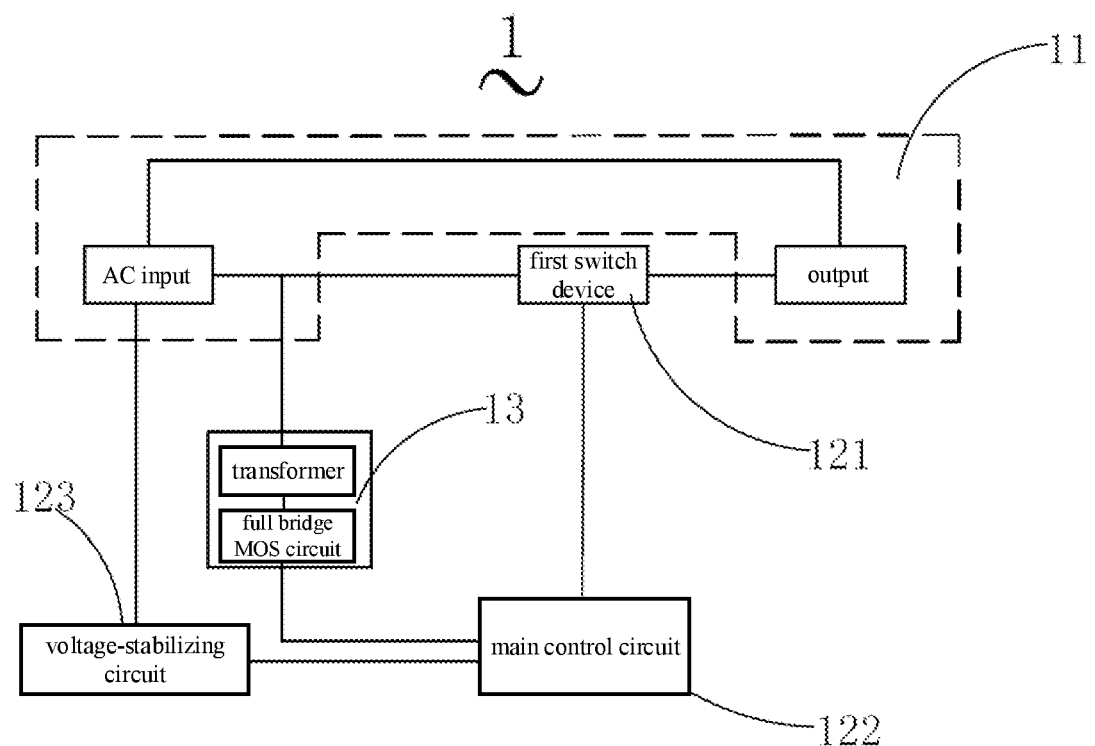
FIG. 3 is a schematic view showing principle of the AC transmission circuit according to the first embodiment of the present disclosure.

Referring to FIGS. 2 and 3, the power supply circuit 11 provided by the first embodiment of the present disclosure includes an AC input terminal and an output terminal. It should be understood, the AC input terminal is configured to input AC, and the output terminal is configured to output AC or direct current (DC). The AC input terminal provides power supply to a whole socket.

Specifically, the power supply circuit 11 provided by the first embodiment of the present disclosure includes a varistor MOV1 configured to remove surge voltage in an AC power supply, a capacitor C2 configured to filter out clutter, and a resistor R1. The varistor MOV1 is connected between the L line and the N line of the AC power supply.

It should be understood, the main control circuit 122 is signal connected to the first switch device 121 and controls on-off of the first power supply circuit 11 by the first switch device 121, which allows the main control circuit 122 to control on-off of the power supply circuit 11 on demand. That is, when AC is inputted into the main control circuit 122, the main control circuit 122 controls on-off of the first switch 121 so as to control on-off of the power supply circuit 11.

Optionally, the first switching device 121 can be a combination of one or more of TRIACs, relays and MOS tubes. Specifically, in the first embodiment of the present disclosure, the first switching device 121 is a TRIAC.

It should be understood, by setting the first switching device 121 as a semiconductor switch that is not physically opened and closed, a problem prone to ignite at a switch in an AC transmission circuit is effectively avoided, so as to improve safety and reliability of the AC transmission circuit 1, and further to prolong service life of the switching circuit 12 in the AC transmission circuit 1. Thus, the safety of the power supply circuit 11 of the AC transmission circuit 1 is improved.

It should be understood, the main control circuit 122 of the present disclosure can be a single chip microcomputer, a microcontroller, a field programmable gate array, a general array logic or any combination thereof.

Figure 4:
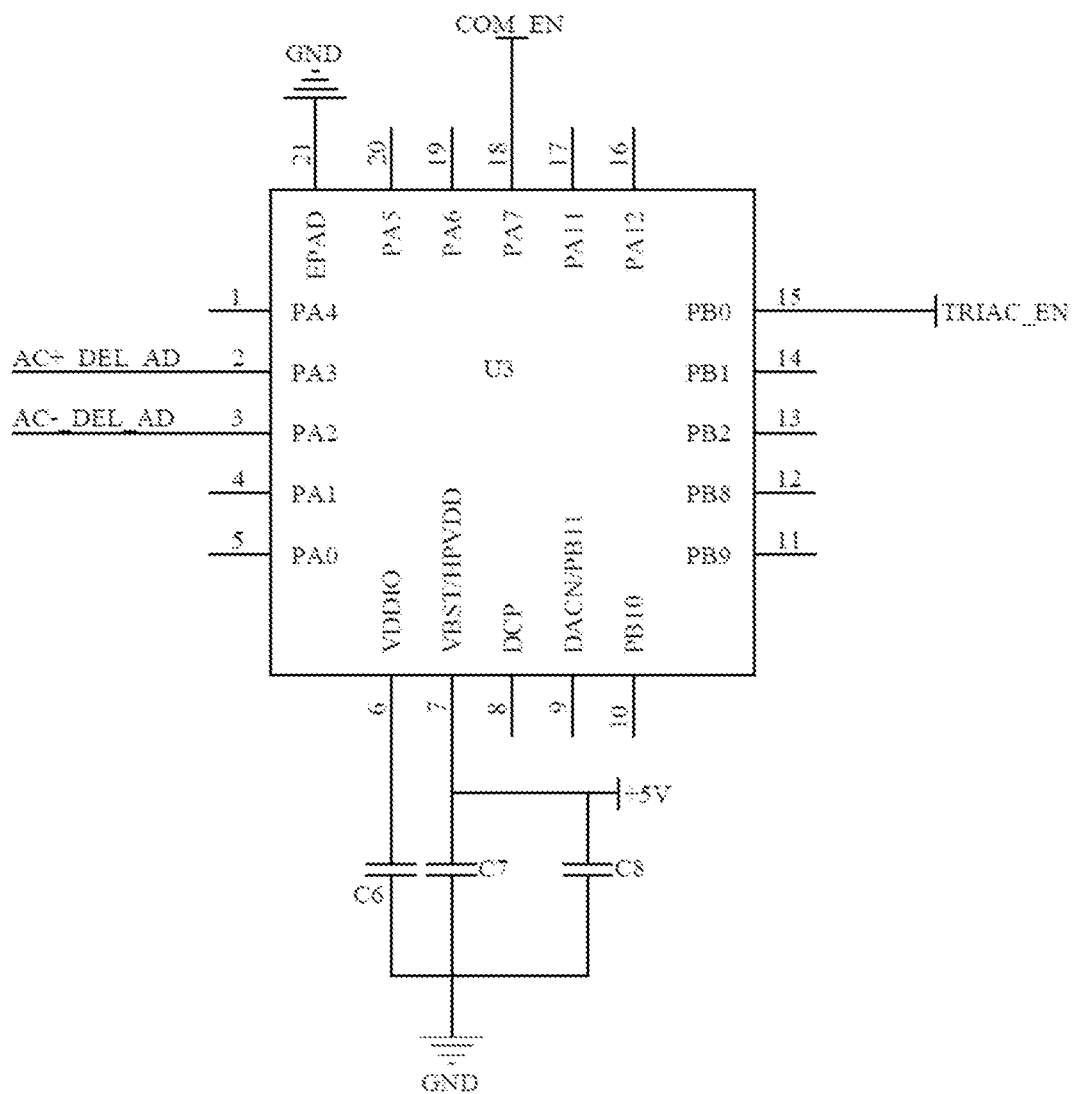
FIG. 4 is a schematic view showing principle of a main control circuit of the AC transmission circuit according to the first embodiment.

Specifically, referring to FIGS. 2 and 4, the main control circuit 122 of the present disclosure can be a microcontroller. The main control circuit 122 can be QFN20 having 21 pins.

Figure 6:
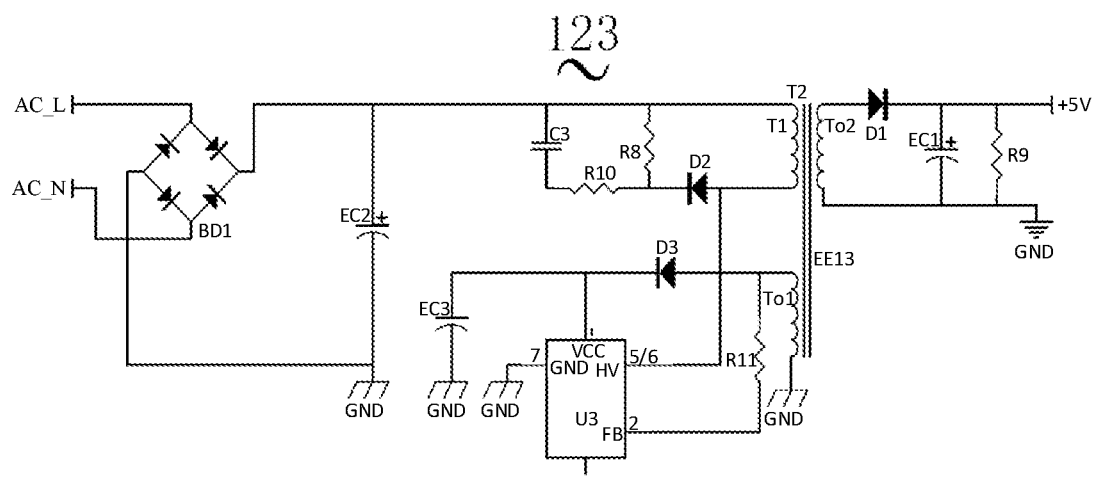
FIG. 6 is a waveform diagram showing output current of an AC transmission circuit in prior art.

Additionally, referring to FIG. 6, in the prior art, since the switch will turn off at zero-crossing, which may cause a sudden change of the output current of the power supply circuit when the switch turns off at zero-crossing, thus, a voltage surge may occur at the output terminal of the power supply circuit and/or the equipment connected to the output terminal of the power supply circuit. Therefore, turning off of the switch at zero-crossing may cause damage of the power supply circuit and/or the electronic equipment connected to the power supply circuit, and cause wave diagram of output current incomplete.

Figure 7:
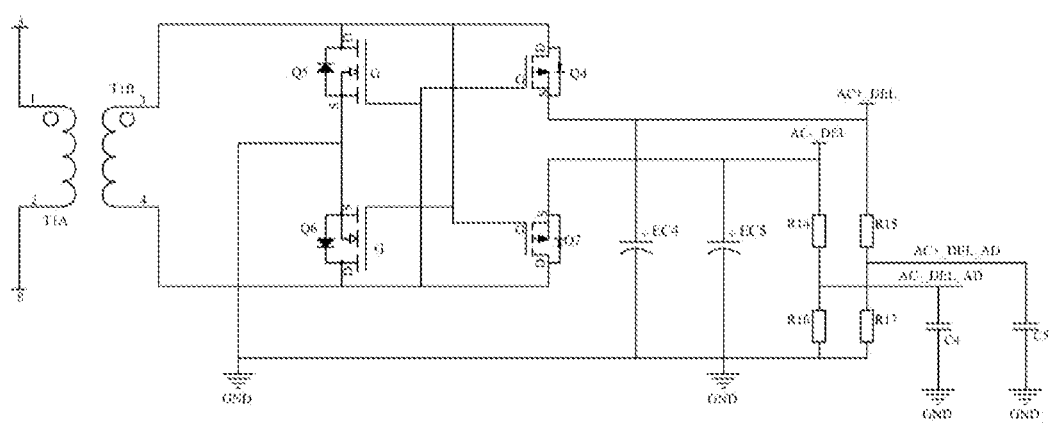
FIG. 7 is a waveform diagram showing output current of the AC transmission circuit according to the first embodiment of the present disclosure.

Additionally, referring to FIG. 7, the AC transmission circuit 1 can output complete wave by compensating for current of the power supply circuit 11.

It should be understood, the snubber circuit 124 is configured to compensate for current of the power supply circuit 11. That is, when the first switch turns off at zero-crossing, the main control circuit 122 controls the snubber circuit 124 to be switched on.

It should be understood, by arranging the snubber circuit 124 and the first switch device 121 in parallel, when the first switch device 121 turns off at zero-crossing, the main control circuit 122 controls the snubber circuit 124 to be switched on, so that current at the input terminal of the power supply circuit 11 can be transmitted to the output terminal through the snubber circuit 124. Therefore, it can avoid sudden change of the output current of the power supply circuit 11 so as to solve problems that voltage surges occur at circuits or electronic equipment electrically connected to the power supply circuit 11. Therefore, by compensating for current of the power supply circuit 11 when the first switch device 121 turns off at zero-crossing, it can avoid voltage surges due to sudden change of current.

Figure 8:
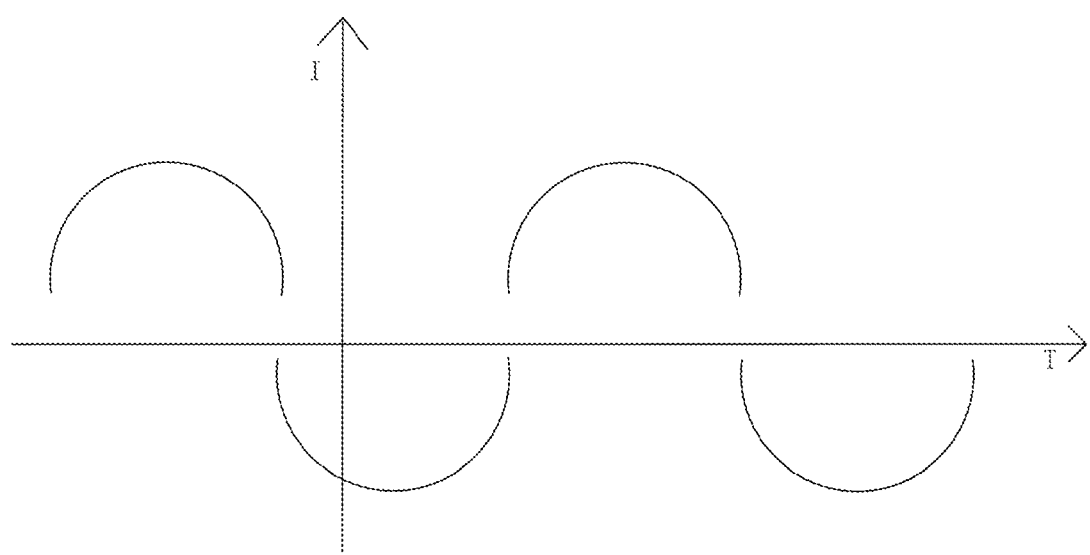
FIG. 8 is a schematic view of a third circuit module of the AC transmission circuit according to the first embodiment of the present disclosure.

Additionally, referring to FIG. 8, the snubber circuit 124 includes a second switch device 1241. One terminal of the second switch device 1241 is connected to the main control circuit 122, the other terminal of the second switch device 1241 is connected to the power supply circuit 11.

It should be understood, the main control circuit 122 controls the second switch device 1241 to be switched on so as to controls the snubber circuit 124 to compensate for the current of the power supply circuit 11.

Additionally, the second switch device 1241 includes a relay and/or a metal oxide semiconductor (MOS) tube.

Figure 9:
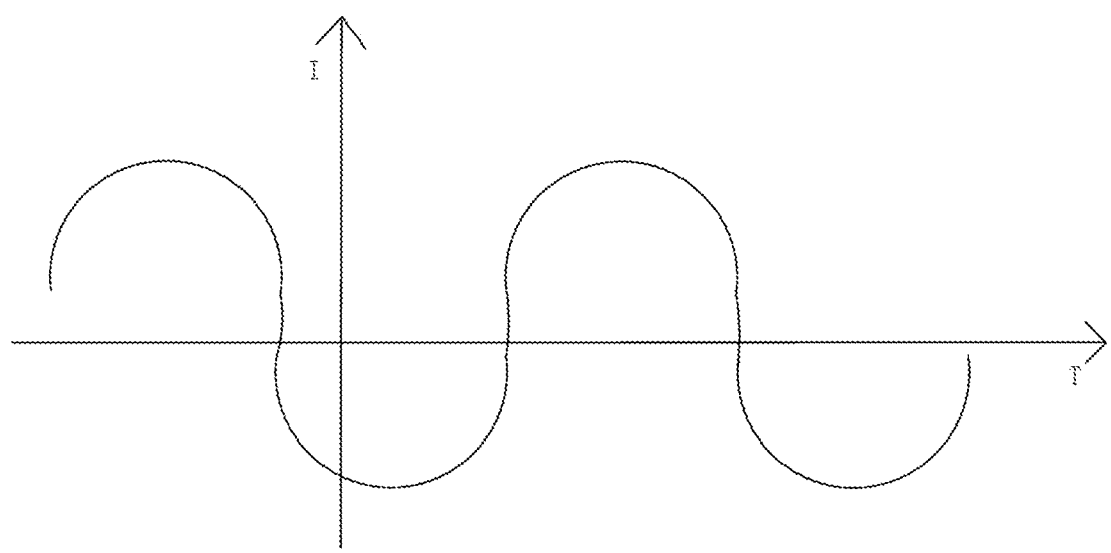
FIG. 9 is a schematic view of a fourth circuit module of the AC transmission circuit according to the first embodiment of the present disclosure.

Referring to FIG. 9, as an exemplary embodiment of the present disclosure, the second switch device 1241 provided by the first embodiment of the present disclosure includes a relay. The second switch device 1241 further includes a MOS transistor. The main control circuit 122 is connected to the relay through the MOS transistor and controls on-off of the relay by controlling the MOS transistor.

Specifically, referring to FIGS. 3 and 9, the snubber circuit 124 provided by the first embodiment of the present disclosure includes a relay K1, a MOS transistor Q2, a resistor R5 and a resistor R7. The gate of MOS transistor Q2 is connected with an eighteenth pin (that is, PA7 pin) of the main control circuit 122 through the resistor R5; The drain of the MOS transistor Q2 is connected with one terminal of the relay K1, the other terminal of relay K1 is connected with the power supply circuit 11, the source of MOS transistor Q2 is grounded, one terminal of the resistor R7 is connected with the gate of MOS transistor Q2, and the other terminal of the resistor R7 is connected with GND.

It should be understood, the design that the main control circuit 122 controls the on-off of the relay K1 through the MOS transistor Q2 can improve response speed of the second switching device 1241. When the first switching device 121 is turned off at zero-crossing, turning on of the snubber circuit 124 is controlled through the MOS tube Q2 and the relay K1, so that the snubber circuit 124 can timely compensate for the current of the power supply circuit 11. In addition, the design of arranging the relay K1 in the snubber circuit 124, so that the snubber circuit 124 can also electrically isolate the power supply circuit 11 from the main control circuit 122, so as to effectively avoid the problem that the main control circuit 122 is damaged by the high voltage in the power supply circuit 11, and to further improve the safety and reliability of the AC power transmission circuit 1.

It should be understood, when the first switch device 121 turns off at zero-crossing, the main control circuit 122 controls the MOS transistor Q2 to be turned on so as to control the relay K1 to be turned on to compensate for the current of the power supply circuit 11. When the first switch device 121 turns on, the main control circuit 122 controls the MOS transistor Q2 to be turned off, so as to the relay K1 to be turned off to turn off compensation for the current of the power supply circuit 11.

Figure 10:
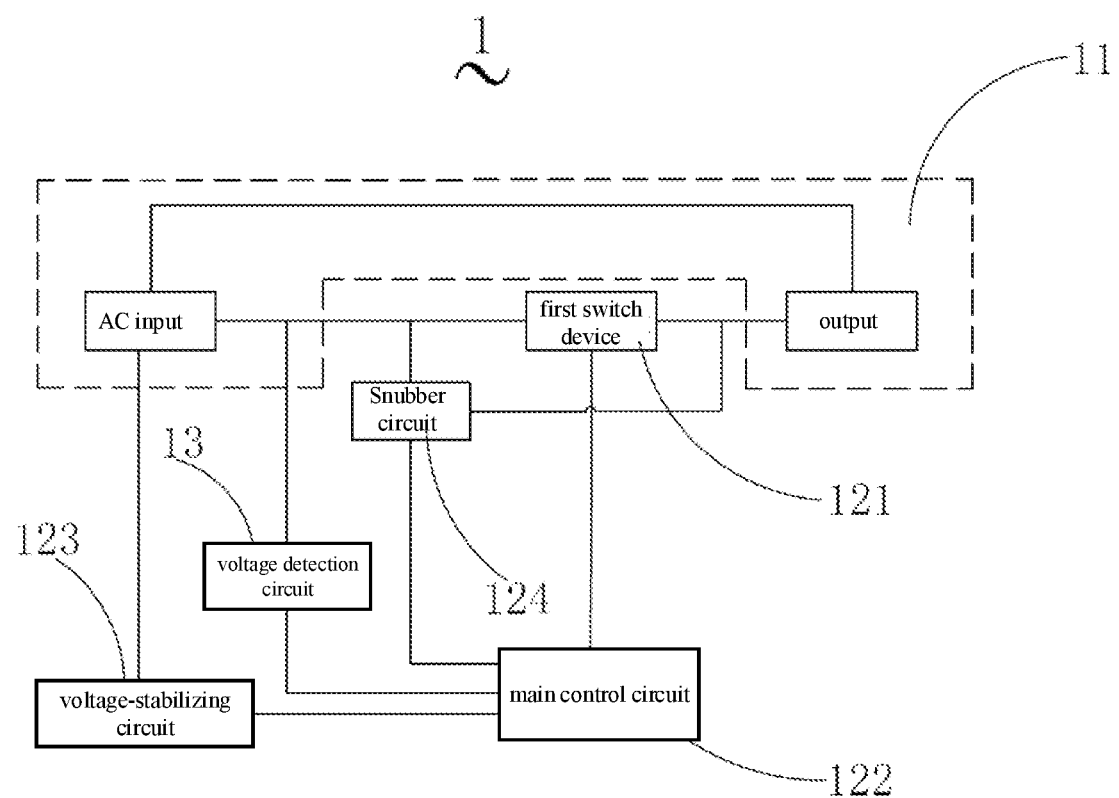
FIG. 10 is a schematic view of a fifth circuit module of the AC transmission circuit according to the first embodiment of the present disclosure.

Referring to FIG. 10, as another exemplary embodiment, the second switch device 1241 provided by the first embodiment of the present disclosure includes a MOS transistor. The second switch device 1241 further includes an isolation control element, The MOS transistor and the power supply circuit 11 are connected and the MOS transistor is signal connected to the main control circuit 122 through the isolation control element.

It should be understood, through the design that the second switch device 1241 includes the MOS transistor can improve response speed of the second switch device 1241. Since the MOS transistor itself cannot isolate elements, the MOS transistor is signal connected to the main control circuit 122 through the isolation control element. The design that the MOS transistor is connected to the main control circuit 122 through the isolation control element can electrically isolate the power supply circuit 11 and the main control circuit 122 so as to prevent the main control circuit 122 from being damaged due to direct connection between the power supply circuit 11 and the main control circuit 122.

Figure 11:
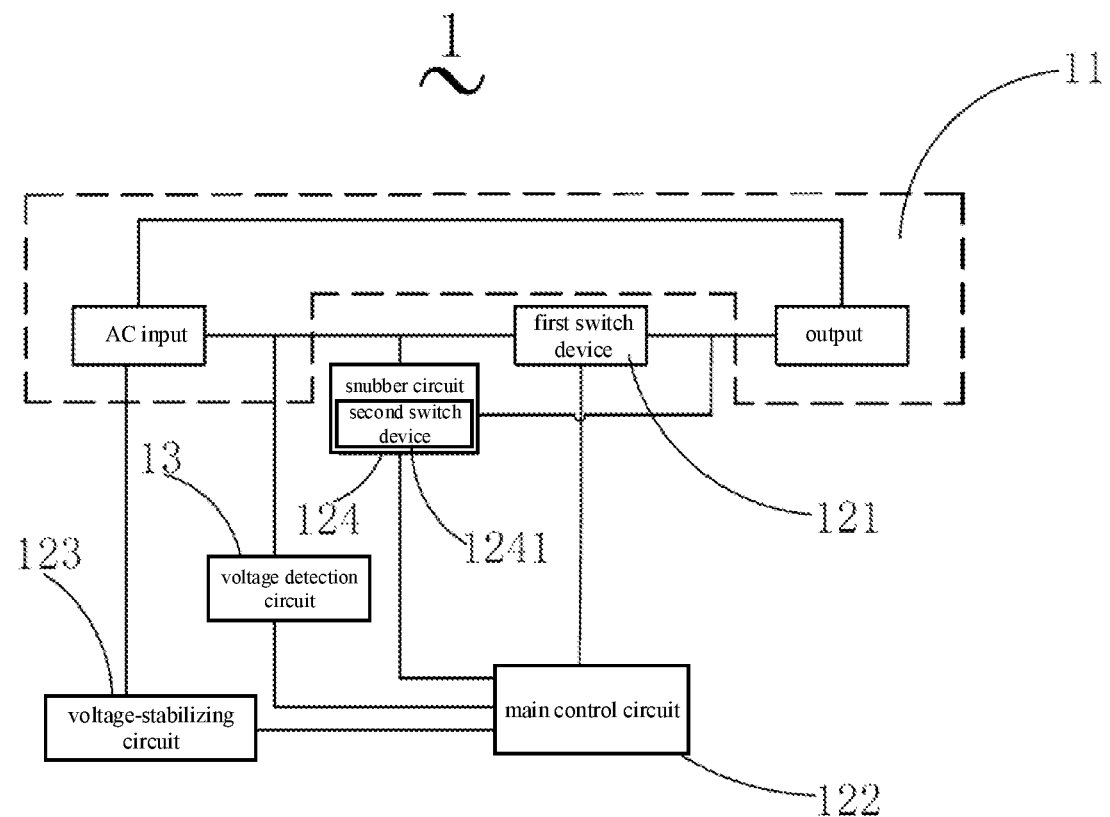
FIG. 11 is a schematic view of a sixth circuit module of the AC transmission circuit according to the first embodiment of the present disclosure.
Figure 12:
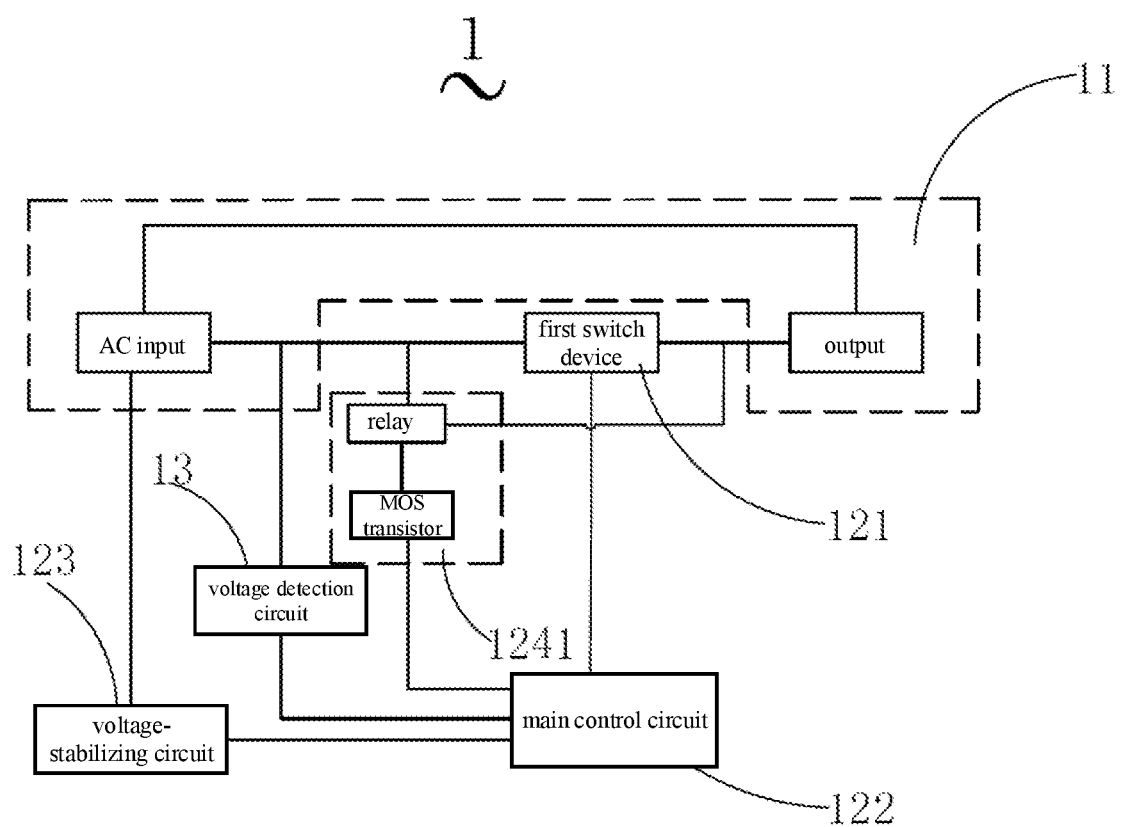
FIG. 12 is a schematic view of a seventh circuit module of the AC transmission circuit according to the first embodiment of the present disclosure.

Additionally, referring to FIGS. 11 and 12, the AC transmission circuit 1 provided by the first embodiment of the present disclosure further includes a voltage detection circuit 13. The voltage detection circuit 13 detects the AC voltage and phase at the input terminal of the power supply circuit 11. An input terminal of the voltage detection circuit 13 is connected to the power supply circuit 11, and an output terminal of the voltage detection circuit 13 is connected to the main control circuit 122.

It should be understood, detection of the AC voltage and the phase of the AC power supply of the power supply circuit 11 by the voltage detection circuit 13 allows the main control circuit 122 to timely control the switch circuit 12 based on an input voltage of the power supply circuit 11. In an exemplary embodiment, when the voltage detection circuit 13 detects that the input voltage of the power supply circuit 11 is too large, the main control circuit 122 can immediately control the switch circuit 12 to be switched off so as to prevent the AC transmission circuit 1 and/or the electronic equipment connected to the power supply circuit 11 from being damaged due to over large voltage. When the voltage detection circuit 13 detects that the input voltage of the power supply circuit 11 returns to normal, the main control circuit 122 can also timely control the switch circuit 12 to be switched on so as to make the power supply circuit 11 to return to normal work states. Furthermore, detection of the AC voltage and the phase of the AC power supply of the power supply circuit 11 by the voltage detection circuit 13 allows the main control circuit 122 to timely control the switch circuit 12 to be turned on based on magnitude and phase of the input voltage of the power supply circuit 11, so as to ensure timely compensation for the current of the power supply circuit by the snubber circuit 124. That is, the voltage detection circuit 13 can further prevent sudden change of the current of the power supply circuit 11 so as to further improve safety and reliability of the AC transmission circuit 1.

If a diode is used to detect the voltage at the input terminal of the AC transmission circuit 1, voltage drop of detected voltage is relatively large, which will lead to the detected voltage value being lower than actual voltage value and detected waveform being lower than expected waveform. Therefore, the present disclosure adopts a full bridge MOS circuit to detect the voltage and phase at the input terminal of the AC transmission circuit, which can make the voltage value detected by the voltage detection circuit 13 closer to the actual voltage value, so as to greatly improve accuracy of voltage detection.

It should be understood, the full bridge MOS circuit can more accurately detect voltage of the AC power supply of the power supply circuit 11, timely and accurately detect positive and negative peaks of the voltage of the power supply circuit 11, so as to reduce difference between the voltage value detected by the voltage detection circuit 13 and the actual voltage value, and then more accurately detect the voltage of the AC power supply of the AC transmission circuit 1. In addition, the safety and reliability of the AC transmission circuit 1 can be further ensured by more accurately detecting the voltage and phase of the AC power supply of the AC transmission circuit 1.

Figure 13:
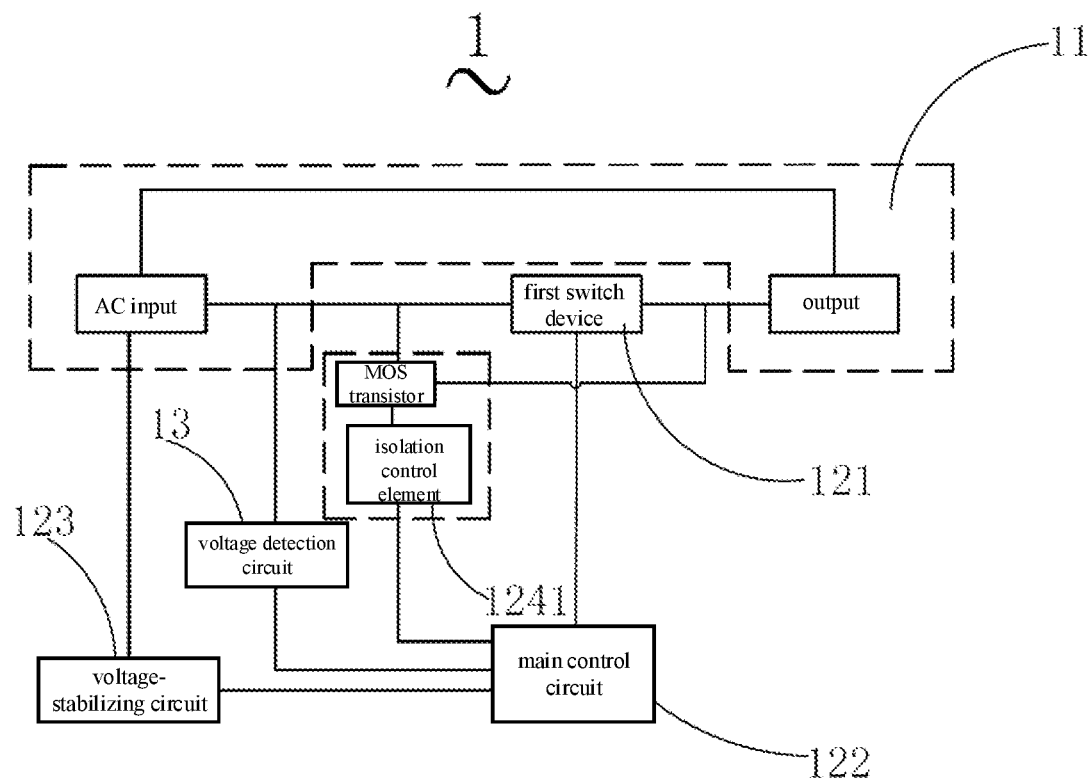
FIG. 13 is a schematic view showing principle of a voltage detection circuit of the AC transmission circuit according to the first embodiment of the present disclosure.

Additionally, referring to FIGS. 12 and 13, the voltage detection circuit 13 includes a transformer and a full bridge MOS circuit. The primary coil of the transformer is connected with the power supply circuit 11, and the secondary coil of the transformer is connected with the main control circuit 122 through the full bridge MOS circuit.

Specifically, referring to FIG. 13, the voltage detection circuit 13 of the present disclosure at least includes a transformer T1, a MOS transistor Q4, a MOS transistor Q5, a MOS transistor Q6 and a MOS transistor Q7. A first terminal and a second terminal of the primary coil of the transformer T1 are connected between the L line and the N line of the AC power supply. A third terminal of the secondary coil of the transformer T1 is connected with the drain of the MOS transistor Q5, the drain of the MOS transistor Q4, the gate of the MOS transistor Q6 and the gate of the MOS transistor Q7. A fourth terminal of the secondary coil of the transformer T1 is connected with the drain of the MOS transistor Q6, the drain of the MOS transistor Q7, the gate of the MOS transistor Q4 and the gate of the MOS transistor Q5. The source of the MOS transistor Q5 and the source of the MOS transistor Q6 are connected to GND. The source of the MOS transistor Q4 is connected to a second pin (that is, PA3 pin) of the main control circuit 122. The source of the MOS transistor Q4 is connected to GND through a resistor R15 and a resistor R17. The source of the MOS transistor Q7 is connected to a third pin (that is, PA2 pin) of the main control circuit 122. The source of the MOS transistor Q7 is connected to GND through a resistor R14 and a resistor R16.

Specifically, when a voltage at the third terminal of the secondary coil of the transformer T1 is a positive voltage, the voltage at the fourth terminal of the secondary coil of the transformer T1 is a negative voltage. The voltage flows through the MOS transistor Q4 to the main control circuit 122 and GND. At this time, the MOS transistor Q4 is inputted with high level, the MOS transistor Q4 is turned on, the MOS transistor Q6 and the MOS transistor Q7 form a closed loop, and they are not turned on. When the high level is inputted at the third terminal of the secondary coil of transformer T1, the MOS transistor Q4 is always on. Because the MOS transistor Q4 itself has a parasitic diode, its internal resistance is very small after the MOS transistor Q4 is turned on, so the voltage drop of the detected voltage will be small, and then the detected voltage signal will be outputted to the main control circuit 122 through the source of the MOS transistor Q4. The source of MOS transistor Q4 is connected to GND through the resistor R15 and the resistor R17.

when a voltage at the third terminal of the secondary coil of the transformer T1 is a negative voltage, the voltage at the fourth terminal of the secondary coil of the transformer T1 is a positive voltage. The voltage flows through the MOS transistor Q7 to the main control circuit 122 and GND. At this time, the MOS transistor Q7 is turned on, the MOS transistor Q5 and the MOS transistor Q4 form a closed loop, and they are not turned on. When the high level is inputted at the fourth terminal of the secondary coil of transformer T1, the voltage at the drain of the MOS transistor Q7 is a positive voltage, a voltage at the gate of the MOS transistor Q7 is a negative voltage, there is a voltage difference between the drain and the gate of the MOS Q7, and the MOS Q7 is turned on. Because the MOS transistor Q7 itself has a parasitic diode, its internal resistance is very small after the MOS transistor Q7 is turned on, so the voltage drop of the detected voltage will be small, and then the detected voltage signal will be outputted to the main control circuit 122 through the source of the MOS transistor Q7. The source of MOS transistor Q7 is connected to GND through the resistor R15 and the resistor R17.

It should be understood, when the power supply circuit 11 inputs high voltage, the voltage at the primary coil of the transformer T1 is increased, at same time, the voltage at the secondary coil of the transformer T1 is decreased. Furthermore, the secondary coil of the transformer T1 is connected to the main control circuit 122 through the full bridge MOS circuit. The full bridge MOS circuit can detect and switch the AC power supply inputted by the power supply circuit 11, sort out the positive and negative peaks of the AC power supply, and provide voltage signals for voltage and phase detection. The voltage drops at the input terminal of AC transmission circuit 1 detected by the full bridge MOS circuit is smaller, which can further improve accuracy of voltage detection. In addition, detecting the voltage through the full bridge MOS circuit improves accuracy of the voltage detection circuit 13, which can further ensure safety and reliability of the AC transmission circuit 1.

Figure 14:
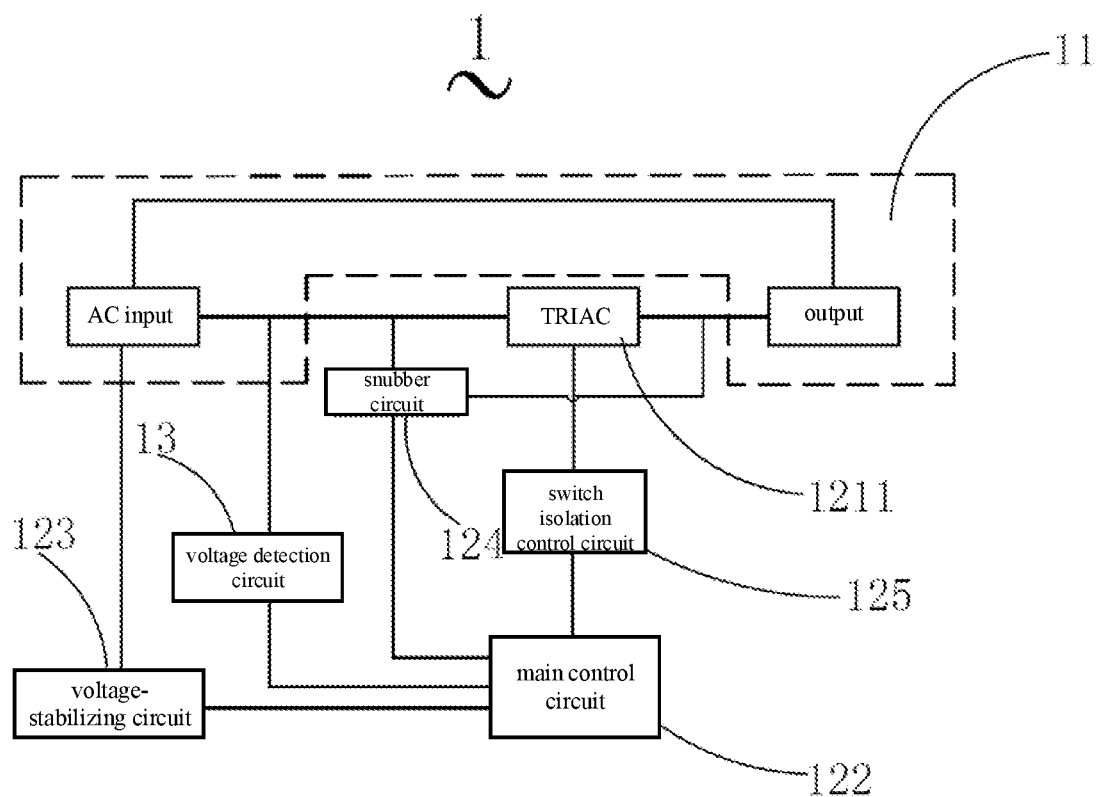
FIG. 14 is a schematic view of a eighth circuit module of the AC transmission circuit according to the first embodiment of the present disclosure.

Additionally, referring to FIG. 14, the first switch device 121 includes a TRIAC 1211. The switch circuit 12 further includes a switch isolation control circuit 125. The TRIAC 1211 is connected to the main control circuit 122 through the switch isolation control circuit 125. The switch isolation control circuit 125 of the present disclosure includes an optocoupler.

It should be understood, the switch isolation control circuit 125 can electrically isolate the power supply circuit 11 and the main control circuit 122 so as to prevent the main control circuit from being damaged due to surge voltage in the power supply circuit 11, thus prolonging service life of the AC transmission circuit. Furthermore, the design that the power supply circuit 11 is electrically isolated from the main control circuit 122 can prevent direct connection between the high voltage AC and the main control circuit 122, which can further improve safety when users control on-off of the AC transmission circuit 1 artificially. Furthermore, the switch isolation control circuit 125 includes the optocoupler, which can further ensure isolation control of the TRIAC 1211 by the main control circuit 122, thereby improving safety of the main control circuit 122.

Additionally, when the TRIAC 1211 is connected to high voltage, it is necessary to isolate the power supply circuit 11 and the main control circuit 122. The optocoupler of the present disclosure has a good isolation function. By setting the optocoupler, the optocoupler is used to directly isolate low voltage and high voltage of the power supply circuit 11 from the main control circuit 122. When the TRIAC 1211 is connected to the high voltage, the duration during which the TRIAC 1211 is turned on can be controlled through the optocoupler, so as to isolate the high voltage of the TRIAC 1211. Thus, the main control circuit 122 is safer and more reliable.

Figure 15:
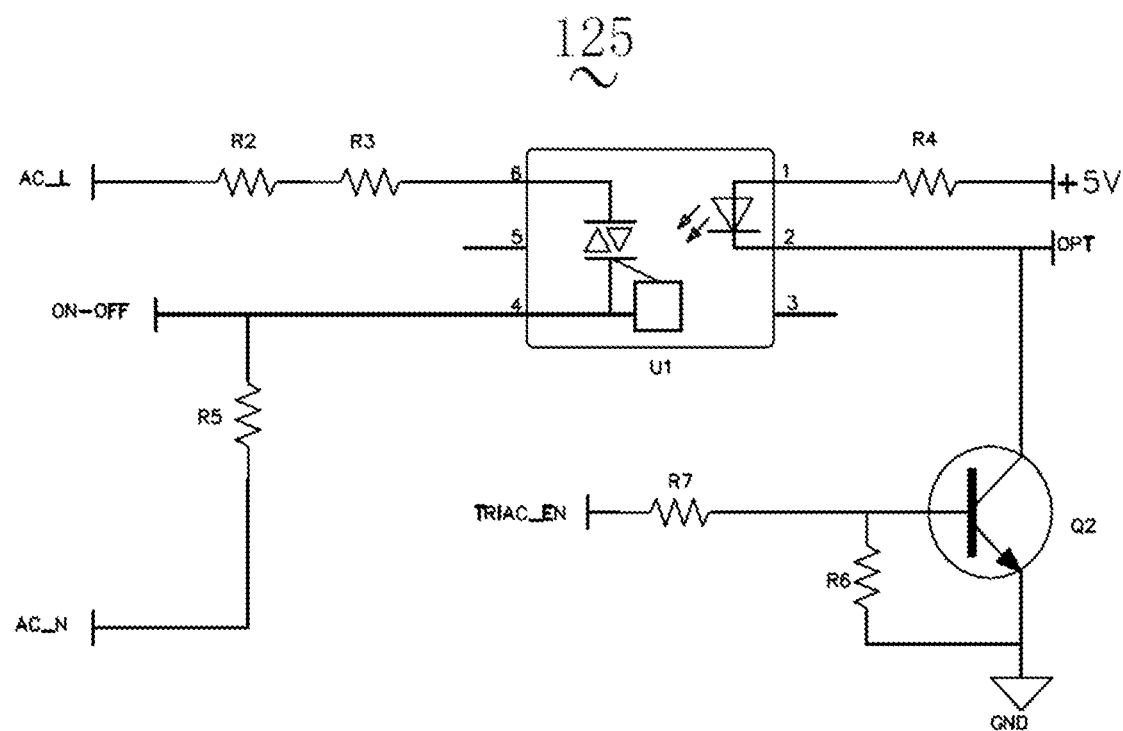
FIG. 15 is a schematic view showing principle of a switch isolation control circuit of the AC transmission circuit according to the first embodiment of the present disclosure.

Specifically, referring to FIG. 15, the switch isolation control circuit 125 at least includes an optocoupler U1, its type is MOC3041 and has a zero-crossing detection circuit inside. The optocoupler U1 controls on-off of the TRIAC according to detection result of the zero-crossing circuit so as to achieve turning off of the TRIAC at zero-crossing.

As stated above, the power supply circuit 11 inputs AC power supply, part of which is transmitted to the voltage-stabilizing circuit 123 and the voltage-stabilizing circuit 123 provides power to the main control circuit 122 and the snubber circuit 124. Another part of the AC power supply is transmitted to electronic equipment connected with the output terminal through the output terminal. The main control circuit 122 controls on-off of the power supply circuit 11 by controlling on-off of the first switch device 121. The snubber circuit 124 is connected in parallel with the first switch device 121. When the first switch device 121 is turned off at zero-crossing, the main control circuit 122 controls the snubber circuit 124 to compensate for the current of the power supply circuit 11. The voltage detection circuit 13 can detect voltage values and phases of the voltage at the input terminal of the power supply circuit 11. The voltage detection circuit 13 includes a transformer and a full bridge MOS circuit. The transformer can electrically isolate the power supply circuit 11 and the switch circuit 12. The voltage drop at the input terminal of the AC transmission circuit 1 detected by the full bridge MOS circuit is smaller. The switch isolation control circuit 125 is configured to electrically isolate the power supply circuit 11 and the main control circuit 122, which can prevent direct connection between high voltage AC and the main control circuit when the AC transmission circuit 1 inputs high voltage. The switch isolation control circuit 125 further includes an optocoupler configured to provide further reliable isolation of the TRIAC 1211.

Figure 16:
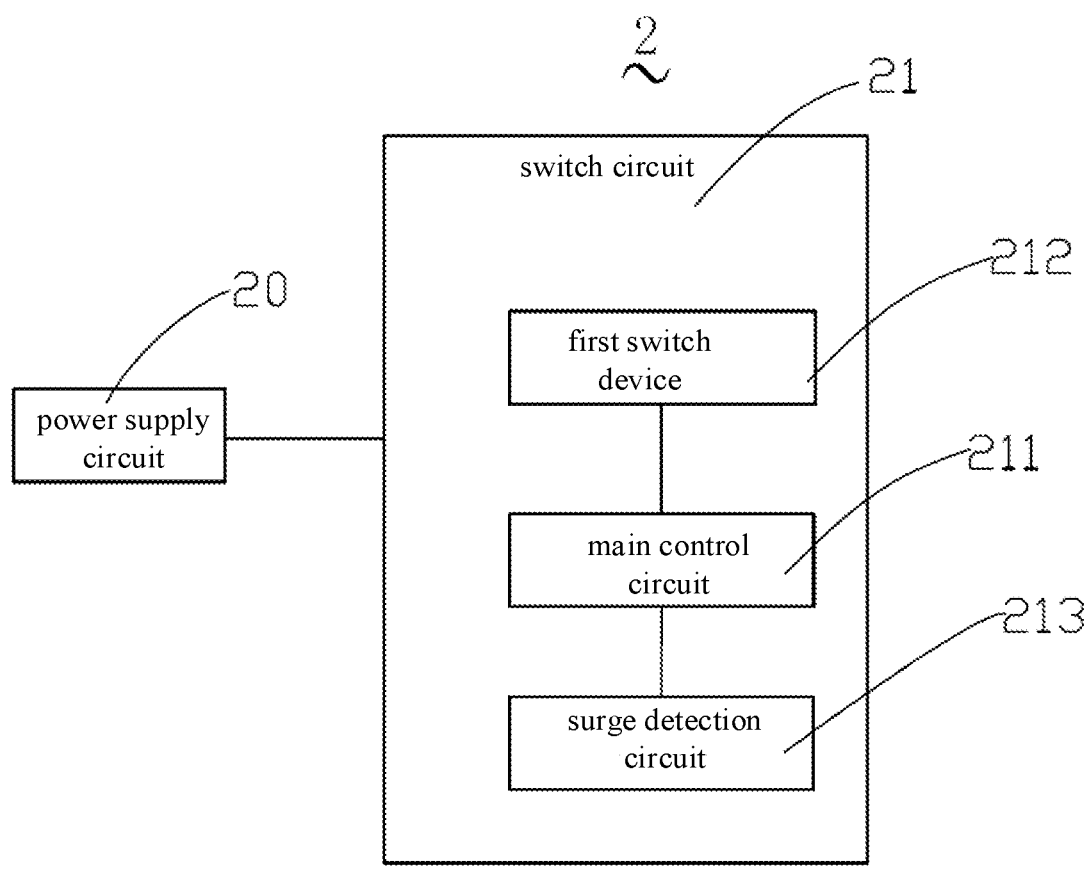
FIG. 16 is a schematic view of a first circuit module of an AC transmission circuit according to a second embodiment of the present disclosure.
Figure 17:
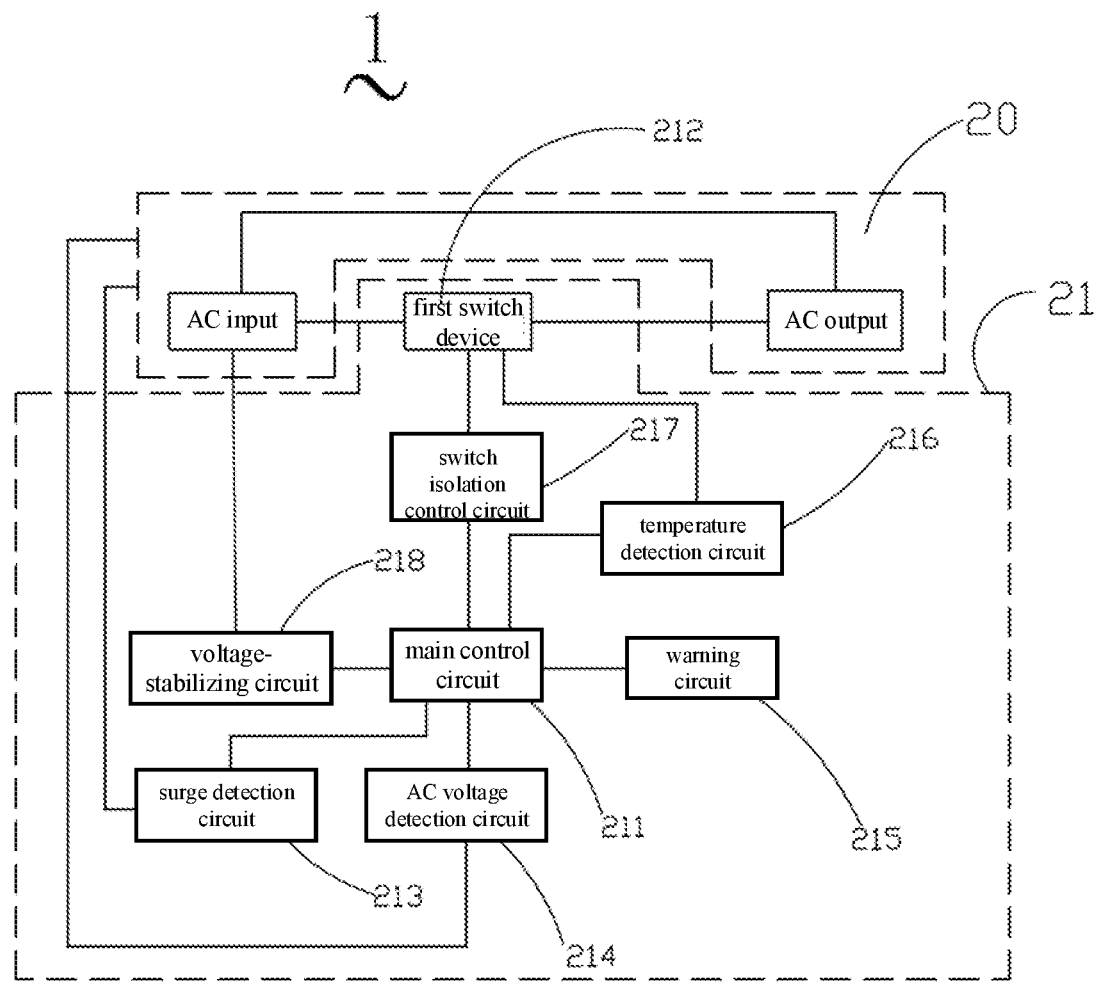
FIG. 17 is a schematic view of a second circuit module of the AC transmission circuit according to the second embodiment of the present disclosure.

Referring to FIGS. 16 and 17, a second embodiment of the present disclosure provides an AC transmission circuit 2. The AC transmission circuit 2 includes a power supply circuit 20 and a switch circuit 21 coupled to the power supply circuit 20. The switch circuit 21 includes a main control circuit 211, surge detection circuit 213, and a first switch device 212 connected in series to the power supply circuit 20. The main control circuit 211 is signal connected to the first switch device 212 and controls on-off of the power supply circuit 20 by controlling the first switch device 212. An input terminal of the surge detection circuit 213 is connected to the power supply circuit 20, and an output terminal of the surge detection circuit 213 is connected to the main control circuit 211.

It should be understood, the switch circuit 21 provided by the second embodiment of the present disclosure includes a main control circuit 211 and the first switch device 212 connected in series to the power supply circuit 20. The main control circuit 211 is signal connected to the first switch device 212 and controls on-off of the power supply circuit 20 by controlling the first switch device 212. By the design that the first switch device 20 is coupled to the power supply circuit 20, it can effectively avoid ignition at the switch device in the AC transmission circuit 2. Therefore, it can improve safety and reliability of the AC transmission circuit 2.

Additionally, by the design that the first switch device 212 controls on-off the AC transmission circuit 2, it can make service life of the switch circuit 21 of the AC transmission device 2 more longer, thereby prolonging service life of the switch circuit 21 of the AC transmission device 2.

Additionally, the switch circuit 21 provided by the second embodiment of the present disclosure includes a voltage-stabilizing circuit 218. The voltage-stabilizing circuit 218 is connected to the main control circuit 211 and provides power to the main control circuit 211.

It should be understood, the voltage-stabilizing circuit 218 in the second embodiment of the present disclosure can be an input circuit connected to a primary input terminal. The input circuit is an input circuit of a conventional Primary-Side-Regulation (PSR) system, and includes an AC input, a primary rectifier and a primary filter connected successively. Then, the primary input power supply is provided to the voltage stabilizing circuit 218, a load to be charged is connected to a secondary output terminal, and the secondary output terminal provides charging power supply to the load.

It should be noted, part of the power supply inputted by the power supply circuit 20 of the second embodiment of the present disclosure is transmitted to the voltage-stabilizing circuit 218, another part of the power supply is configured to provide power to a socket. The voltage-stabilizing circuit 218 provides power to the main control circuit 211, the surge detection circuit 213, an AC voltage detection circuit 214, a warning circuit 215, a temperature detection circuit 216, and a switch isolation control circuit 217.

Figure 18:
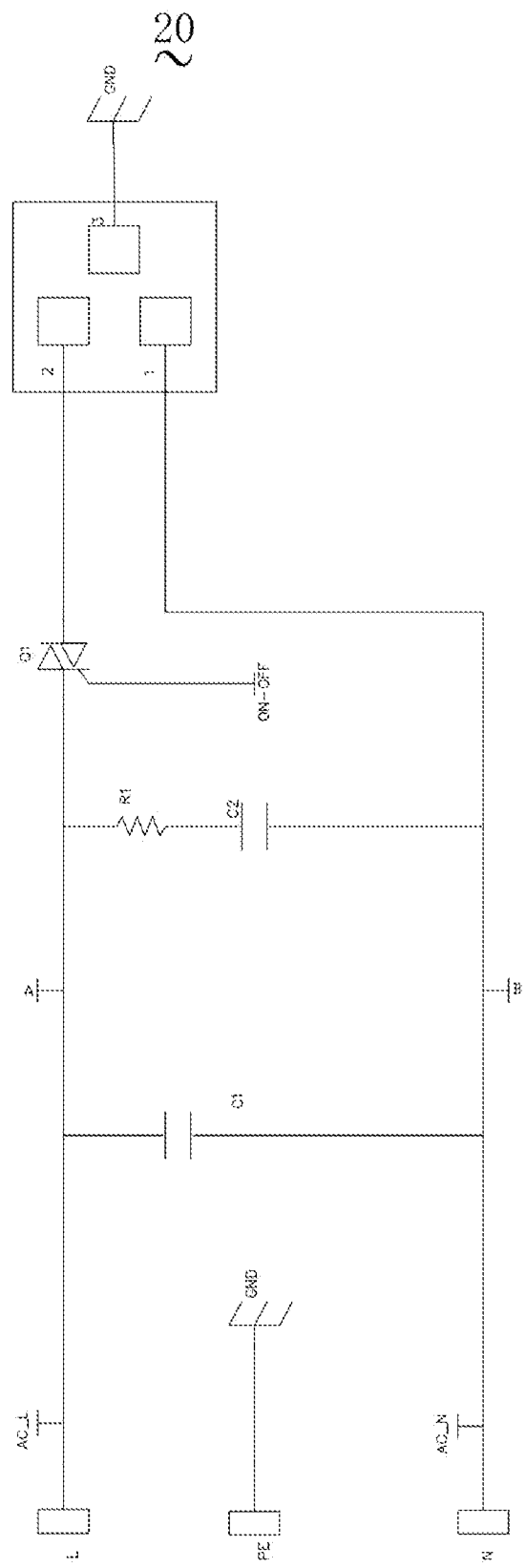
FIG. 18 is a schematic view showing principle of the AC transmission circuit according to the second embodiment of the present disclosure.

Referring to FIGS. 17 and 18, the power supply circuit 20 of the second embodiment of the present disclosure includes an AC input and an AC output. It should be understood, the AC input is configured to input AC power supply, and the AC output is configured to output AC power supply and provides power to the socket.

The switch circuit 21 of the second embodiment of the present disclosure includes the surge detection circuit 213, a resistor R1, a capacitor C2, the first switch device 212 and the main control circuit 211. The resistor R1 and the capacitor C2 are connected in series to form a RC (resistance capacitance) absorber, which can protect the first switching device 212 from breakdown. The surge detection circuit 213 is connected to the power supply circuit 20. The first switch device 212 is coupled to the power supply circuit 20. The first switch device 212 and the surge detection circuit 213 are connected to the main control circuit 211.

It should be understood, when the AC power supply is inputted, the main control circuit 211 controls on-off of the first switch device 212 so as to control on-off of the power supply circuit 20.

It should be noted, the first switch device 212 of the second embodiment can be a TRIAC, a relay and/or a MOS transistor. The design setting the first switching device 121 as a semiconductor switch that is not physically opened and closed, a problem prone to ignite along on/off of a physical switch can be effectively avoided, so as to improve safety and reliability of the AC transmission circuit 2. If the first switch device 212 is a TRIAC, the problem that it is prone to ignite at a switch in an AC transmission circuit can be efficiently solved, so as to improve safety and reliability of the AC transmission circuit 2. Furthermore, the design that the on-off of the AC transmission circuit 2 is controlled by the TRIAC can make service life of the switching circuit 21 in the AC transmission circuit 2 longer, thus, the service life of the switching circuit 21 in the AC transmission circuit 2 is improved.

It should be understood, the switch circuit 21 further includes a surge detection circuit 213, which can detect abnormal conditions including voltage surges and breakdown, and protect internal components from damage when the voltage goes abnormal so as to ensure normal working of the AC transmission circuit 2.

It should be understood, the main control circuit 211 of the second embodiment can be a single chip microcomputer, a microcontroller, a field programmable gate array, a general array logic or any combination thereof.

Figure 19:
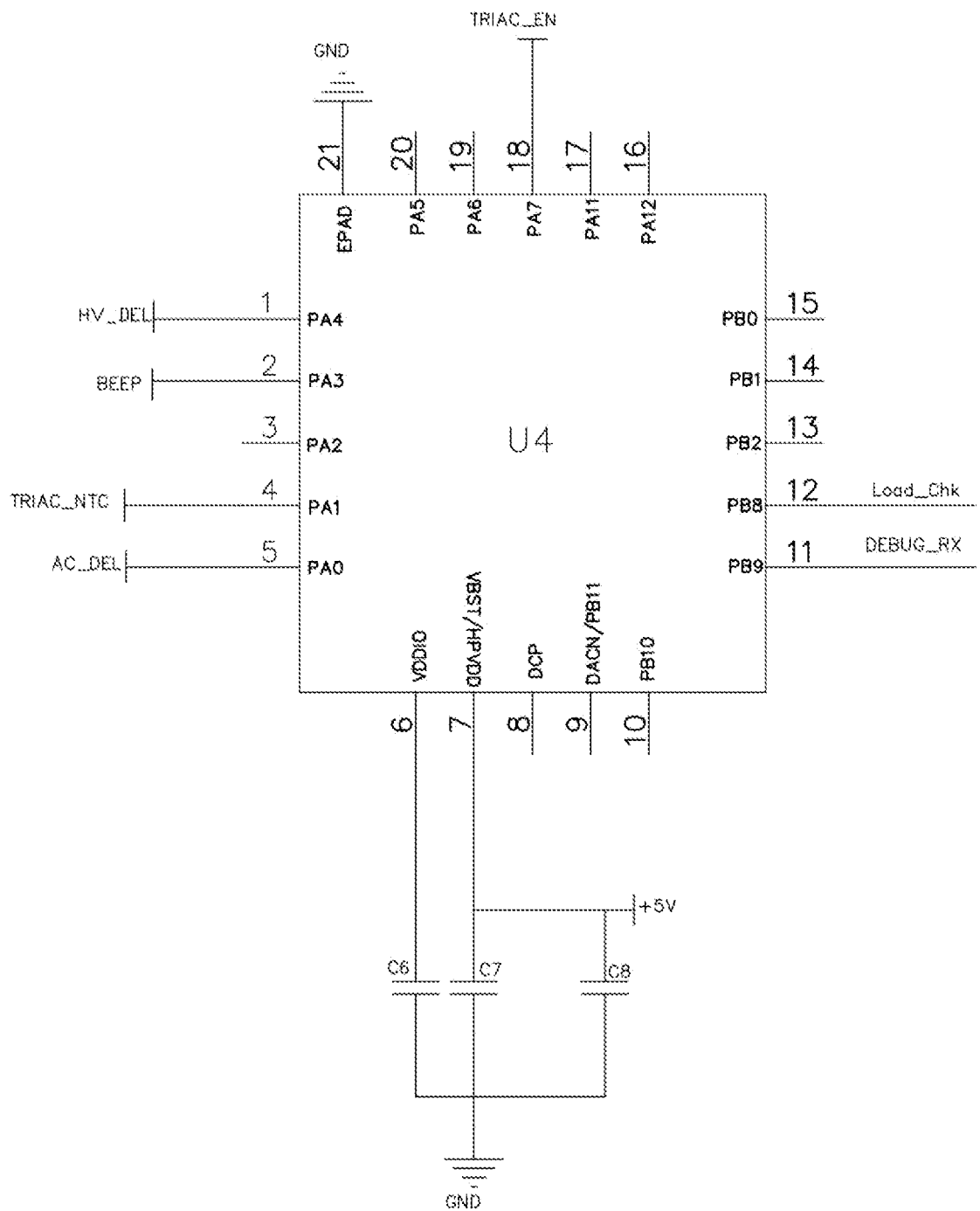
FIG. 19 is a schematic view showing principle of a main control circuit of the AC transmission circuit according to the second embodiment.

Specifically, referring to FIG. 19, the main control circuit 211 of the second embodiment of the present disclosure can be a QFN20 chip U4. It is an 8-bit microcontroller (MCU) based on a low-power platform, which makes it very suitable for any battery operation application. It also has 8 KB flash memory, 0.5 KB ram, 16 digital I/O pins, 4×16 bit timer, 3 PCA channels and other peripheral communication devices.

The main control chip U4 is configured to control on-off of the first switch device 212. The main control chip U4 is further configured to receive detected signals from the surge detection circuit 213 and the AC voltage detection circuit 214. The main control chip U4 is further configured to receive detected temperature information from the temperature detection circuit 216.

Figure 21:
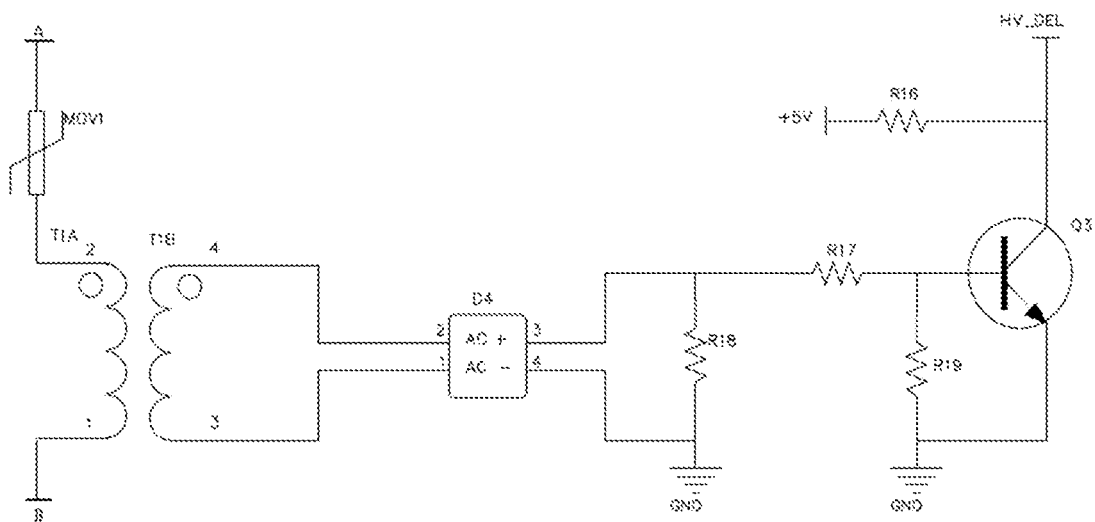
FIG. 21 is a schematic view showing principle of a surge detection circuit of the AC transmission circuit according to the second embodiment of the present disclosure.

Additionally, referring to FIGS. 18 and 21, the surge detection circuit 213 of the second embodiment of the present disclosure at least includes a varistor MOV1 and a transformer T1. The varistor MOV1 is connected to the power supply circuit 20. The primary coil of the transformer T1 is connected to the power supply circuit 20 through the varistor MOV1. The secondary coil of the transformer T1 is connected to the main control circuit 211. That is, the varistor MOV1 is connected to the main control circuit 211 through the transformer T1. Through such arrangements, the transformer T1 can electrically isolate the power supply circuit 20 and the switch circuit 21 so as to improve safety of the AC transmission circuit 2. Furthermore, when the power supply circuit 20 inputs high voltage, the varistor MOV1 is conducted. The main control circuit 211 detects whether there is high voltage is inputted by detecting whether the varistor is conducted. Therefore, the main control circuit 211 can accurately detects inputted voltage, and timely controls on-off of the first switch device 212 according to the inputted voltage to control on-off of the power supply circuit 20, which can protect the AC transmission circuit from voltage surges.

Specifically, the surge detection circuit 213 of the second embodiment of the present disclosure includes a varistor MOV1, a transformer T1, an AC-AC transformer D4, a resistor R16, a resistor R17, a resistor R18, a resistor R19, and a triode Q3. One terminal of the varistor MOV1 is connected to the power supply circuit 20, the other terminal of the varistor MOV1 is connected with the primary coil of the transformer T1. The secondary coil of the transformer T1 is connected with one terminal of the AC-AC transformer D4. The other terminal of the AC-AC transformer D4 is connected with one terminal of the resistor R18. The one terminal of the resistor R18 is connected with one terminal of the resistor R17, the other terminal of the resistor R18 is connected to GND. The other terminal of the resistor R17 is connected to one terminal of the resistor R19, the other terminal of the resistor R19 is connected to GND. The emitter of the triode Q3 is connected to GND, the base of the triode Q3 is connected with the resistor R17 and the resistor R19. The collector of the triode Q3 is connected with PA4 pin of the main control circuit 211.

It should be understood, when the power supply circuit 20 inputs low voltage, the varistor MOV1 remains open and is not conducted. At this time, the first switch device 212 is turned on. When the power supply circuit 20 inputs high voltage, the varistor MOV1 is conducted. At this time, inputted voltage and current increase. Before breakdown of the first switching device 212, the current of the secondary coil of the transformer T1 changes accordingly under the function of the transformer T1, which makes the potential at the base of the triode Q3 changes from low level to high level, and the triode Q3 changes from off state to on state. The main control circuit 211 detects on-off state of the triode Q3 and controls on-off of the first switching device 212 according to the on-off state of the three-stage transistor Q3, so as to protect the electrical equipment connected with the power supply circuit 20 or the components in the AC transmission circuit 21 from damage due to the high voltage outputted through the power supply circuit 20 the high voltage of the input voltage from damaging the through the power supply circuit 20. Through such arrangements, safety of the AC transmission circuit 2 is improved. It should be understood that the low voltage is relative to the high voltage, where the low voltage refers to the voltage less than the on threshold of the varistor MOV1, and the high voltage refers to the voltage greater than or equal to the on threshold of the varistor MOV1. Optionally, in the embodiment of the present disclosure, the on threshold of the varistor MOV1 is 1000V. When the input voltage is greater than 1000V, the varistor MOV1 is on.

Figure 20:
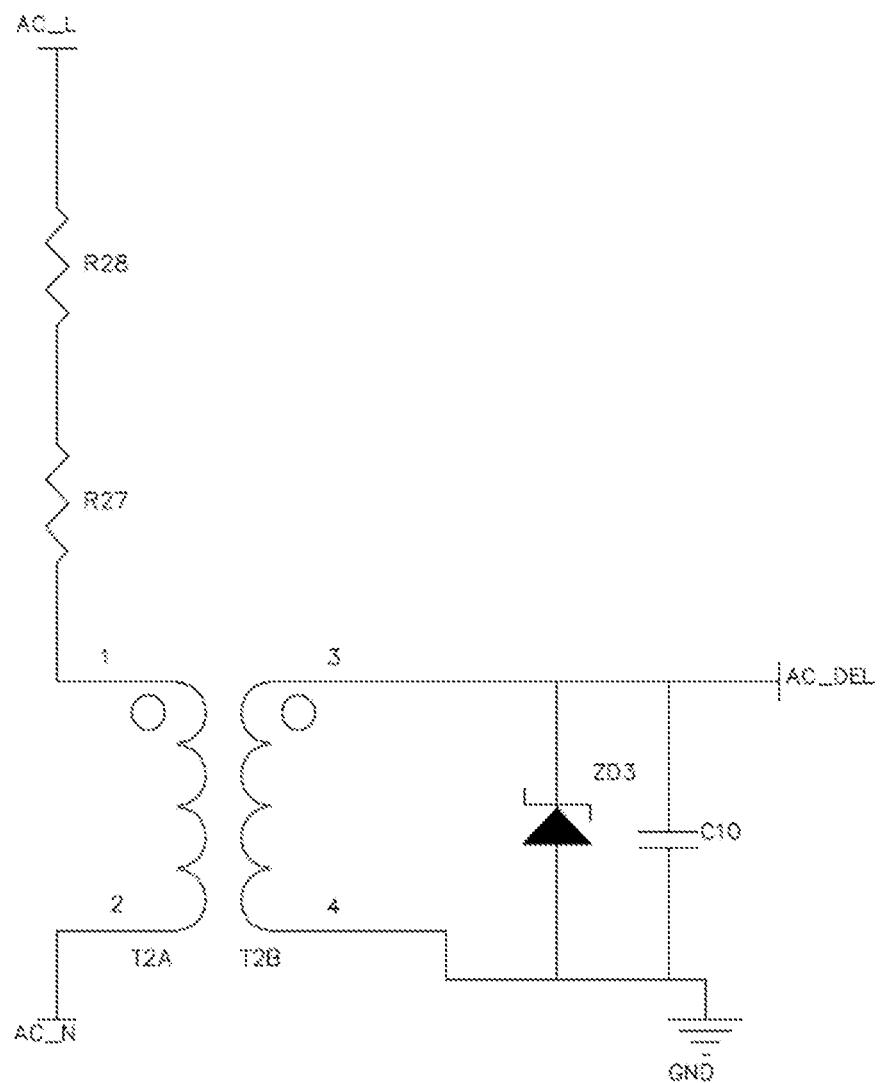
FIG. 20 is a schematic view showing principle of an AC voltage detection circuit of the AC transmission circuit according to the second embodiment of the present disclosure.

Additionally, referring to FIGS. 18 and 20, the switch circuit 21 of the second embodiment of the present disclosure further includes an AC voltage detection circuit 214. The AC voltage detection circuit 214 is connected to the power supply circuit 20 to detect the voltage of the power supply circuit 20. An output terminal of the AC voltage detection circuit 214 is connected to the main control circuit 211.

Specifically, the AC voltage detection circuit 214 includes a resistor R27, a resistor R28, a transformer T2, a diode ZD3, and a capacitor C10. The primary coil of the transformer T2 is connected with the input terminal of the power supply circuit 20. The resistor R27 and the resistor R28 are connected in series and are connected with the primary coil of the transformer T2. The secondary coil of the transformer T2 is connected with the diode ZD3. The positive pole of the diode ZD3 is connected with the capacitor C10.

It should be understood, the AC voltage detection circuit 214 is configured to detect the voltage inputted by the power supply circuit 20. When the AC voltage detection circuit detects that the voltage inputted by the power supply circuit 20 is normal, the main control circuit 211 controls the first switch device 212 to be turned on so as to ensure normal power supply of the power supply circuit 20. When the AC voltage detection circuit detects that the voltage inputted by the power supply circuit 20 is abnormal, the main control circuit 211 controls the first switch device 212 to be turned off so as to control the power supply circuit 20 to stop providing power. Through such arrangements, it further ensures safety and reliability of the AC transmission circuit 2.

Additionally, the main control circuit 211 stores a preset threshold voltage value. When the voltage inputted by the power supply circuit 20 is within the preset threshold voltage value, the main control circuit 211 controls the first switch device 212 to be turned on. In the embodiment, the present threshold voltage value is 90V~250V.

It should be noted, when the power adapter is American Standard, the voltage threshold is 100V~120V When the power adapter is GB, Chinese or European standard, the voltage threshold is 200V~240V.

It should be understood, when the AC input is within the preset threshold voltage value, the first switch device 212 is on. When the AC input beyond the preset threshold voltage value, the main control circuit 211 controls the first switch device 212 to be turned off. At this time, the power supply circuit 20 stop providing power. By design that the AC voltage detection circuit 214 detects whether the AC input is in the normal operating range and the main control circuit 211 controls on-off of the first switch device 212, it can prevent users from artificially controlling the on-off of the AC transmission circuit 2, so as to further improve safety of AC transmission circuit 2.

Figure 22:
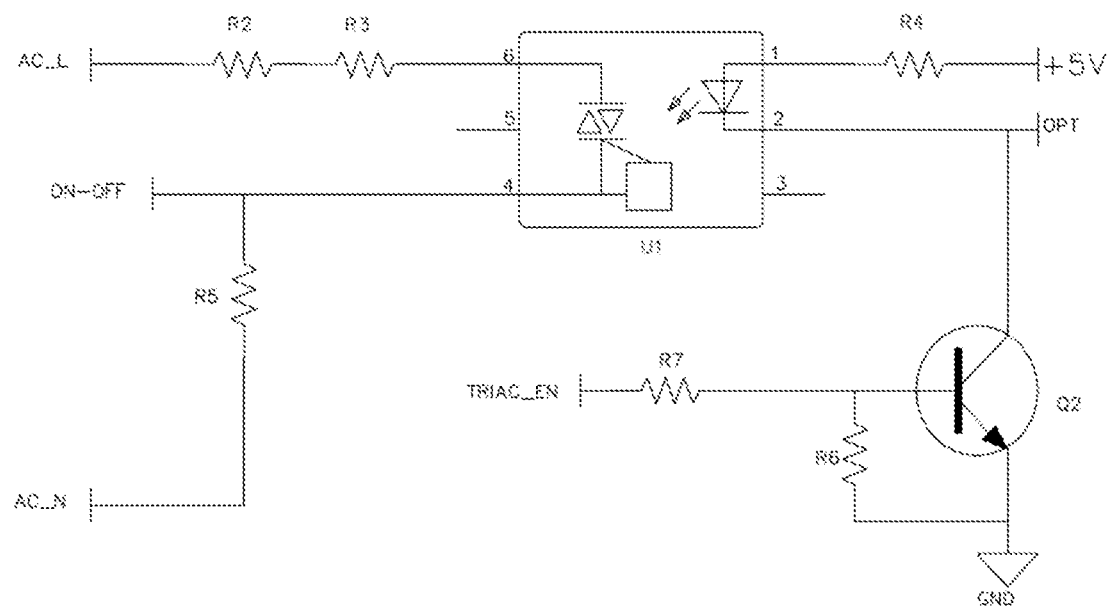
FIG. 22 is a schematic view showing principle of a switch isolation control circuit of the AC transmission circuit according to the second embodiment of the present disclosure.

Additionally, referring to FIGS. 17 and 22, the switch circuit 21 of the second embodiment of the present disclosure further includes a switch isolation control circuit 217. The first switch device 212 is connected to the main control circuit 211 through the switch isolation control circuit 217. In the embodiment, the switch isolation control circuit 217 can include an optocoupler.

It should be understood, by arranging the switch isolation control circuit 217, the main control circuit 211 controls the first switch device 212 through the switch isolation control circuit 217, which can electrically isolate the power supply circuit 20 and the main control circuit 211 so as to protect the main control circuit 211 from being damaged by the voltage surge in the power supply circuit 20. Thus, it can prolong service life of the AC transmission circuit 2. Furthermore, the design that the power supply circuit 20 is electrically isolated from the main control circuit 211 can prevent direct connection between the high voltage AC and the main control circuit 211, which can further improve safety when users control on-off of the AC transmission circuit 1 artificially.

Additionally, when the TRIAC 1211 is connected to high voltages, it is necessary to isolate the power supply circuit 20 and the main control circuit 211. The optocoupler of the present disclosure has a good isolation function. By setting the optocoupler, the optocoupler is used to directly isolate low voltage and high voltage of the power supply circuit 20 from the main control circuit 211. When the first switch device 212 is connected to the high voltage, the duration during which the first switch device 212 is turned on can be controlled through the optocoupler, so as to isolate the high voltage of the first switch device 212. Thus, the main control circuit 211 is safer and more reliable.

Specifically, the switch isolation control circuit 217 includes an optocoupler U1, a resistor R1, a resistor R2, a resistor R3, a resistor R4, a resistor R5, a resistor R6, a resistor R7, and a triode Q2.

The optocoupler U1 has six pins. A positive pole (that is pin 1) of the optocoupler U1 is connected to a 5V voltage through the resistor R4. The collector of the triode Q2 is coupled with a negative pole (that is pin 2) of a light emitter of the optocoupler U1. The emitter of the triode Q2 is connected to GND. The base of the triode Q2 is coupled to with the pin PA7 of the main control circuit U4 through the resistor R7. The resistor R7 is connected series with one terminal of the resistor R6, and the other terminal of the resistor R6 is connected to GND.

One terminal (pin 6) of a light receiver of the optocoupler U1 is coupled with the AC input through the resistor R3 and the resistor R4, the other terminal (pin 4) of the light receiver of the optocoupler U1 is connected with the TRIAC Q1 and the resistor R5. The resistor R5 and the TRIAC Q1 are connected in series. Pin 5 and pin 3 of the optocoupler U1 remains suspended.

It should be understood, a work process of the switch isolation control circuit 217 is as follow: the optocoupler U1 is MOC3041 and has a zero-crossing detection circuit. When corresponding current is inputted into the optocoupler U1, the voltage value between pin 6 and pin 4 of the optocoupler U1 slightly crosses zero, and the TRIAC inside the optocoupler U1 is turned on. When the main control chip U4 collects electrical signals that AC voltage crosses zero, it triggers the main control chip U4 to generate an event interrupt, which triggers the first switch device 212. Therefore, the first switch device 212 is turned on. When 0 mA current is inputted into the optocoupler U1, the TRIAC inside the optocoupler U1 is turned off. After the main control chip U4 receives signals that the TRIAC inside the optocoupler U1 is turned off, the main control chip U4 transmits off signal to the first switch device 212, so as to control the first switch device 212 to be turned off, and then the power supply circuit 20 stops power supply.

Furthermore, the switch circuit 21 of the second embodiment of the present disclosure further includes a temperature detection circuit 216 configured to detect temperature of the AC transmission circuit 2. The temperature detection circuit 216 is connected to the main control circuit 211.

It should be understood, the temperature detection circuit 216 at least includes a thermistor.

It should be understood, the temperature detection circuit 216 detects temperature of the first switch device 212 and feedbacks detected temperature to the main control circuit 211. The main control circuit 211 controls on-off of the first switch device 212 according to the detected temperature.

It should be understood, the temperature detection circuit 216 is configured to detect temperature of the first switch device 212 and transmits detected temperature to the main control circuit 211.

In specific application, by presetting an overheat temperature threshold of the first switch device 212 in advance, when the main control circuit 211 determines that the temperature of the first switch device 212 detected by the temperature detection circuit 216 is beyond the overheat temperature threshold, it means that the temperature of the first switch device 212 is too high and the AC transmission circuit 2 is abnormal at this time. Then, the main control circuit 211 sends an off signal to the first switch device 212. At this time, the first switch device 212 is turned off so as to control the power supply circuit 20 to stop power supply.

Optionally, the preset overheat temperature threshold is 70° C.~110° C. Preferably, the preset overheat temperature threshold is 80° C.~100° C.

Furthermore, the switch circuit 21 of the second embodiment of the present disclosure further includes a warning circuit 215. The main control circuit 211 is signal connected with the warning circuit 215 and controls the warning circuit 215 to output warning signals.

It should be understood, when the surge detection circuit 213 detects abnormal conditions such as voltage surges or lightning, when the AC voltage detection circuit 214 detects that the AC input is beyond threshold voltage value or when the temperature detection circuit 216 detects that the temperature of the AC transmission circuit 2 is abnormal, the warning circuit 215 outputs warning signals.

It should be noted, the warning circuit of the second embodiment of the present disclosure includes a buzzer, an audible and visual alarm, a light alarm, etc. If the warning circuit 215 is a buzzer, when the main control circuit outputs a high level, the buzzer will output sounds.

As stated above, the power supply 20 inputs AC power supply, part of which is transmitted to the voltage-stabilizing circuit 218. The voltage-stabilizing circuit 218 provides power to the main control circuit. The other part of the AC power supply is transmitted to the socket so as to provide power to the socket. The main control circuit 211 controls on-off of the power supply circuit 20 by controlling on-off of the first switch device 212. The surge detection circuit 213 is configured to detect abnormal conditions such as voltage surges and lightning so as to prevent internal components from being damaged under the abnormal conditions. The AC voltage detection circuit 214 can detect voltage values of the input voltage inputted by the power supply circuit 20. When the AC voltage detection circuit 214 detects that the voltage values of the input voltage inputted by the power supply circuit 20 is normal, the main control circuit 211 controls the first switch device 212 to be turned on so as to ensure normal power supply of the power supply circuit 20. When the AC voltage detection circuit 214 detects that the voltage values of the input voltage inputted by the power supply circuit 20 is abnormal, the main control circuit 211 controls the first switch device 212 to be turned off so as to control the power supply circuit 20 to stop power supply. The temperature detection circuit 216 is configured to detect the temperature of the first switch device 212. When the main control circuit 212 determines that the temperature detection circuit 216 detects that the temperature of the first switch device is too high, which indicates that the AC transmission circuit 2 is abnormal. At this time, the main control circuit 211 controls the first switch device 212 to be turned off so as to control the power supply circuit 20 to stop power supply. The switch isolation control circuit 217 is configured to electrically isolate the power supply circuit 20 and the main control circuit 211. When the AC input is high voltage, the switch isolation control circuit 217 can avoid direct electrical connection between the high voltage AC and the main control circuit 211. The switch isolation control circuit 217 further includes an optocoupler, which can further provide reliable isolation of the first switch device 212. When the AC transmission circuit 2 is abnormal, the warning circuit 215 outputs warning signals.

Figure 23:
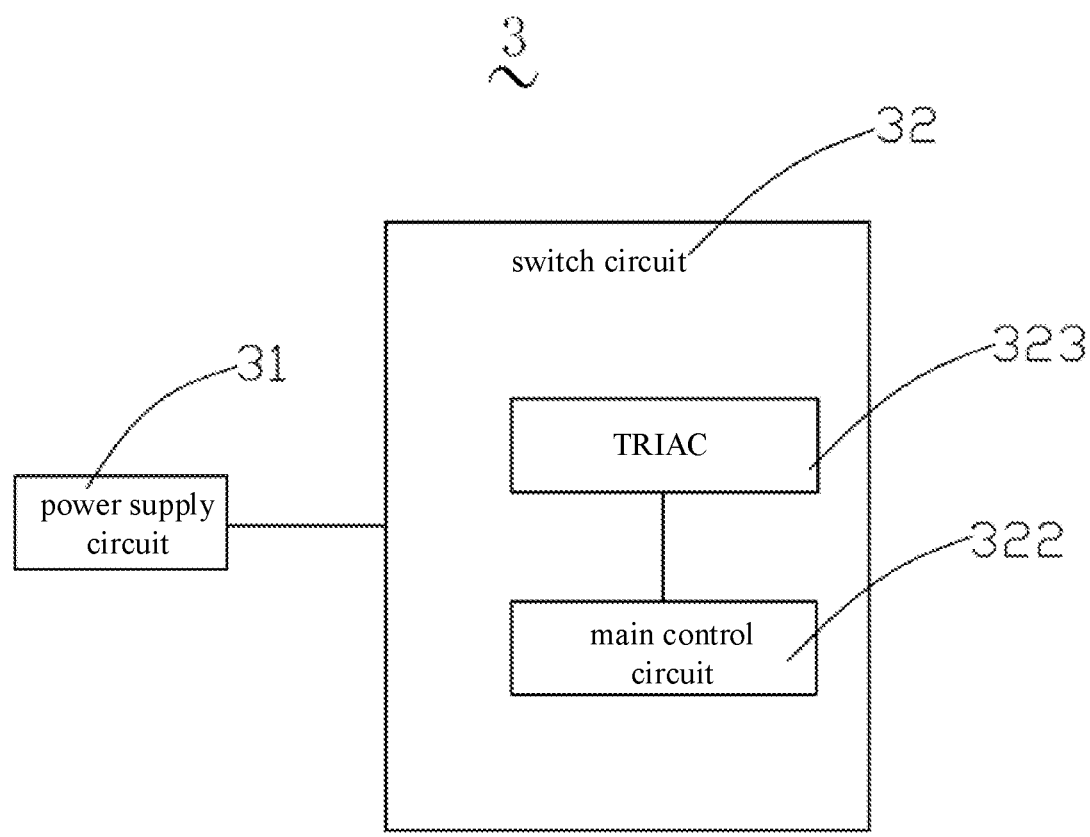
FIG. 23 is a schematic view of a first circuit module of an AC transmission circuit according to a third embodiment of the present disclosure.
Figure 24:
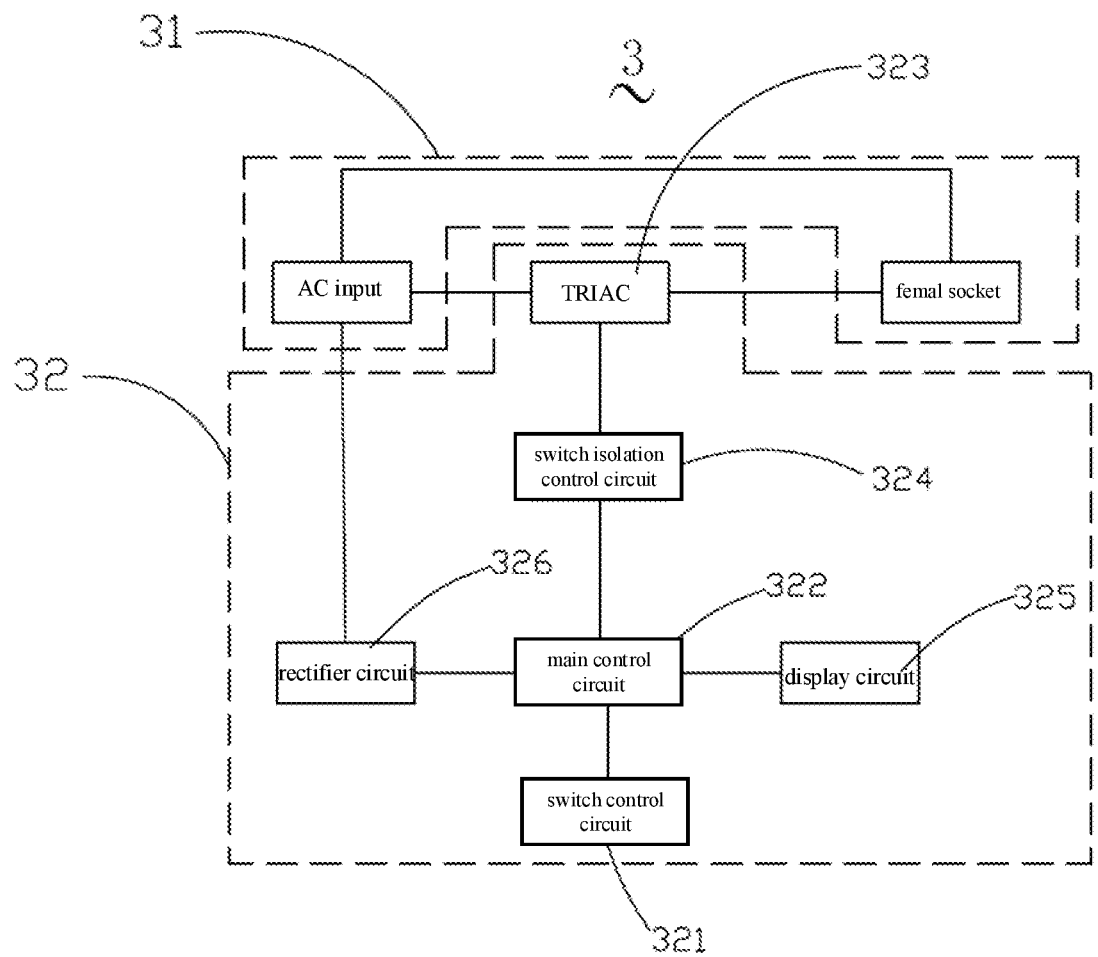
FIG. 24 is a schematic view of a second circuit module of the AC transmission circuit according to the third embodiment of the present disclosure.

Referring to FIGS. 23 and 24, a third embodiment of the present disclosure provides an AC transmission circuit 3. The AC transmission circuit 3 includes a power supply circuit 31 and a switch circuit 32 coupled to the power supply circuit 31. The switch circuit 32 further includes a main control circuit 322 and a TRIAC 323 coupled to the power supply circuit 31. The main control circuit 322 is signal connected to the TRIAC 323 and controls on-off the power supply circuit 31 through the TRIAC 323.

It should be understood, the TRIAC 323 of the third embodiment of the present disclosure is structurally equivalent to two unidirectional thyristors connected reversely. The TRIAC 323 has a function of bidirectional conduction. The advantage of TRIAC 323 is that the TRIAC 323 has a simple control circuit and there is no reverse withstand voltage problem. Therefore, it is especially suitable for an AC contactless switch. The TRIAC 323 is connected in series on the power supply circuit 31, and the TRIAC 323 is signal connected with the main control circuit 322. When the AC transmission circuit 3 inputs high-voltage AC, the on-off of the TRIAC 323 can be controlled by the main control circuit 322, and then the on-off of the power supply circuit 31 can be controlled. He TRIAC 323 is an AC semiconductor switch that is not physically opened and closed, a problem prone to ignite along on/off of a physical switch can be effectively avoided, so as to improve safety. It should be understood that the TRIAC 323 can also be other AC semiconductor switches with same characteristics, such as MOS transistors, relays and other elements.

Figure 25:
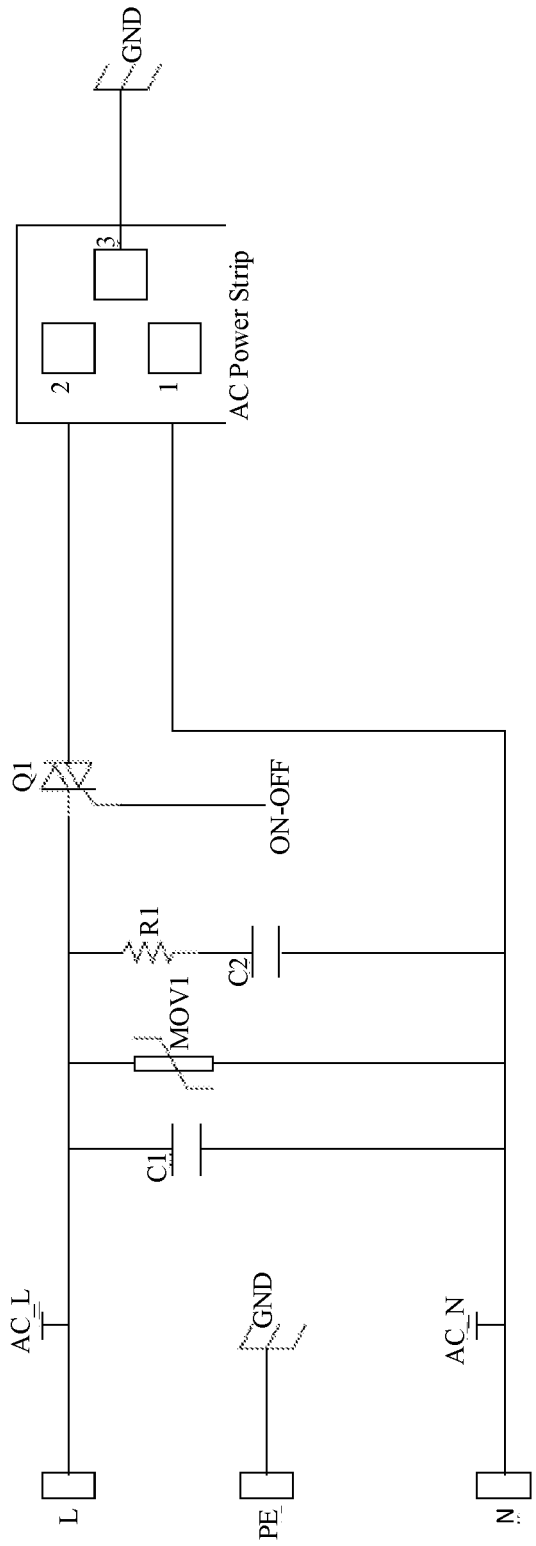
FIG. 25 is a schematic view showing principle of a switch circuit of the AC transmission circuit according to the third embodiment of the present disclosure.

Referring to FIGS. 24 and 25, the switch circuit 32 of the third embodiment of the present disclosure includes TRIAC Q1, a capacitor C1, a varistor MOV1 and a R-C absorb resistor. The capacitor C1 is connected in parallel with the varistor MOV1. The varistor MOV1 is connected in parallel with the R-C absorb resistor. It should be noted, the R-C absorb resistor is consisted of a resistor R1 and a capacitor C2 connected in series and configured to protect the TRIAC Q1 from breakdown. The TRIAC Q1 is coupled with the power supply circuit 31.

A work flow of the switch circuit 32 of the embodiment is: when the AC power supply is inputted, the AC power supply flows through the TRIAC 323, the main control circuit 322 controls on-off of the TRIAC 323 so as to control on-off of the power supply circuit 31.

Figure 26:
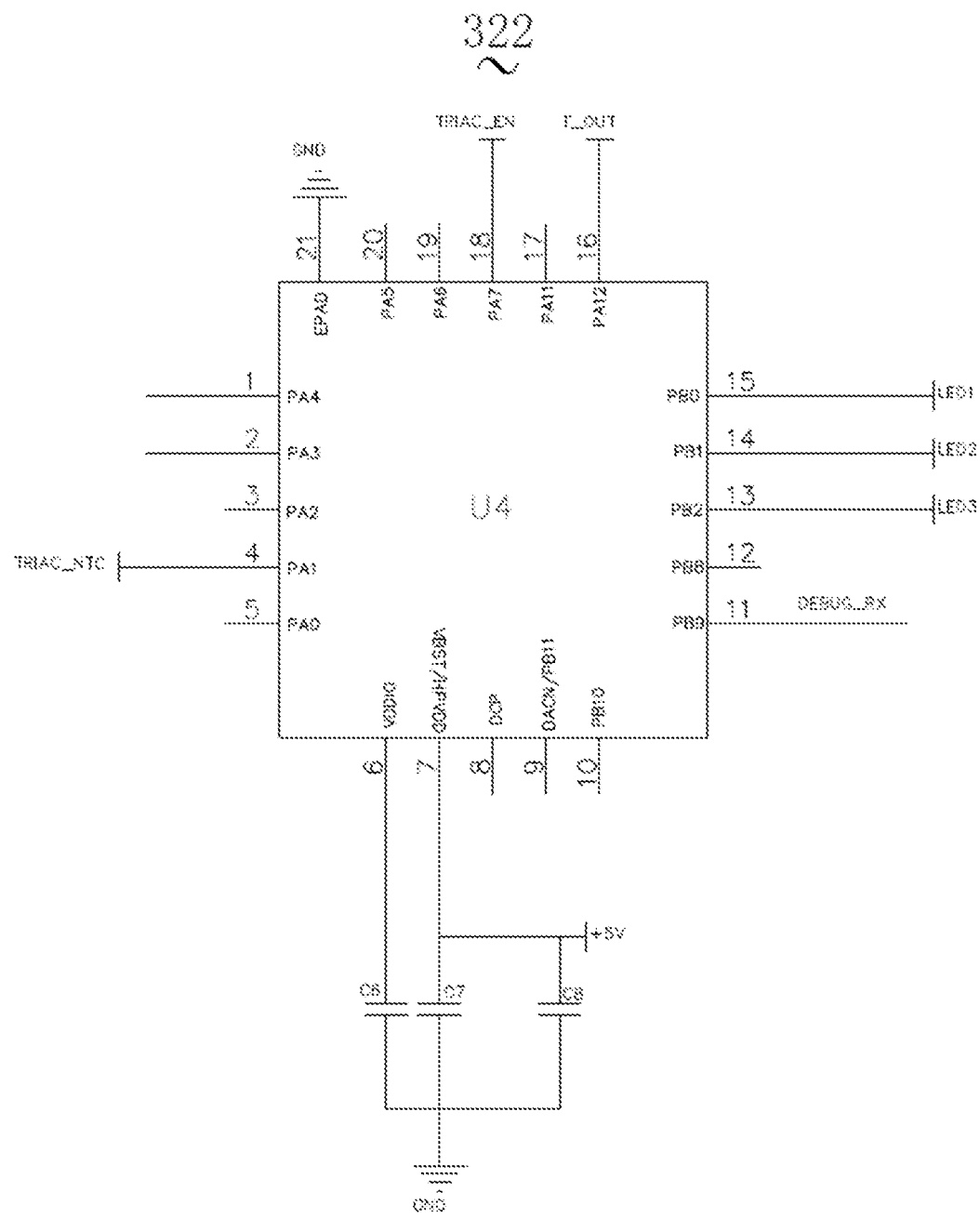
FIG. 26 is a schematic view showing principle of a main control circuit of the AC transmission circuit according to the third embodiment.

Referring to FIGS. 24 and 26, the main control circuit 322 of the third embodiment of the present disclosure includes a main control chip U4 having a model of QFN20. It is an 8-bit microcontroller (MCU) based on a low-power platform, which makes it very suitable for any battery operation application. It also has 8 KB flash memory, 0.5 KB ram, 16 digital I/O pins, 4×16 bit timer, 3 PCA channels and other peripheral communication devices.

The main control chip U4 is configured to collect touch information control on-off of the first switch device 212. The main control chip U4 is responsible for collecting touch information at a touch sensing part in the switch control circuit 321 and controlling the TRIAC Q1 accordingly. The main control chip U4 is further configured to control on-off of the TRIAC Q1. The main control chip U4 is further configured to transmit detected signals including voltages, current and power in the AC transmission circuit 3 to the display circuit. The main control chip U4 is further configured to receive detected temperature information from the temperature detection circuit.

Figure 27:
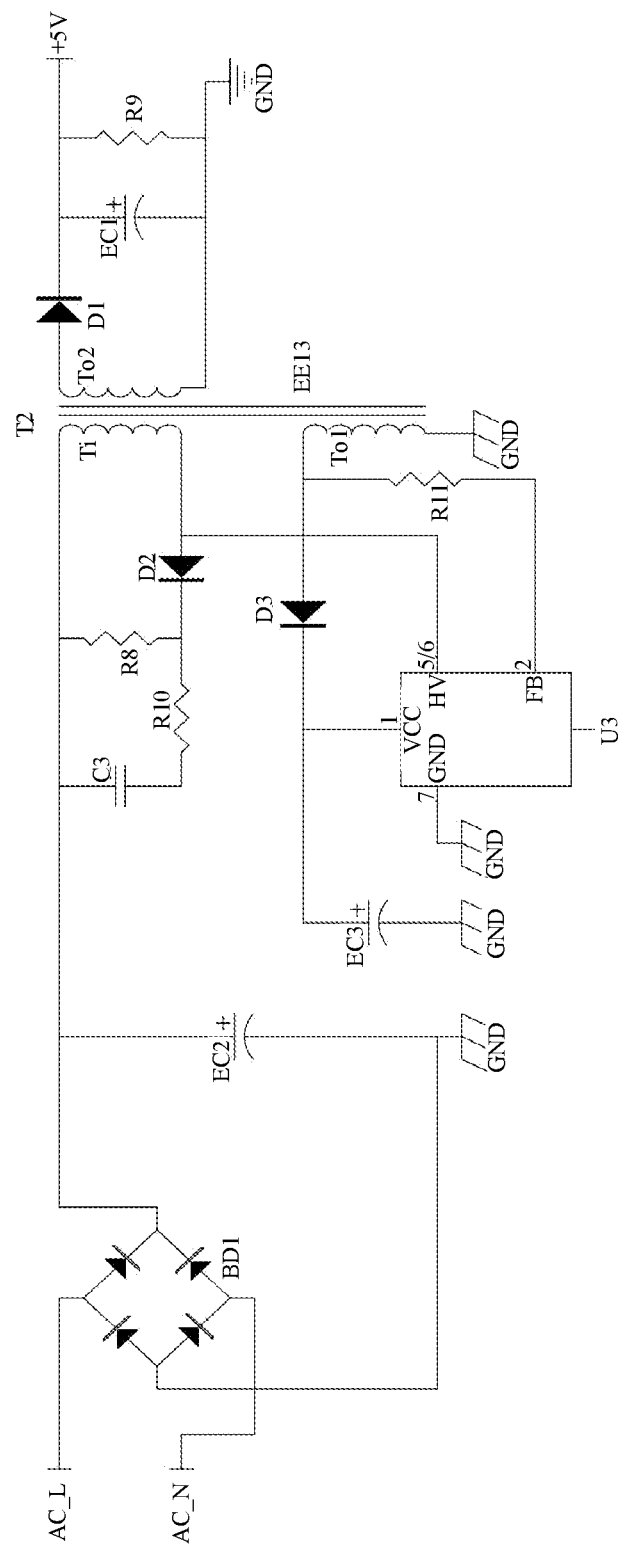
FIG. 27 is a schematic view showing principle of a power supply circuit of the AC transmission circuit according to the third embodiment of the present disclosure.

Referring to FIGS. 24 and 27, the rectifier circuit 326 of the third embodiment of the present disclosure includes a rectifier bridge BD1, a transformer T2, a primary chip U3, a capacitor C3, a filter capacitor EC1, a filter capacitor EC2 and a filter capacitor EC3, a diode D1, a diode D2 and a diode D3, a resistor R8, a resistor r9, a resistor R10 and a resistor R11.

It should be understood, the transformer T2 of the third embodiment of the present disclosure has a primary input terminal Ti, a primary output terminal To1 and a secondary output terminal To2.

Specifically, the primary coil of the transformer T2 is connected with the rectifier bridge BD1. The rectifier bridge BD1 is connected with the filter capacitor EC2. A positive pole of the filter capacitor EC2 is connected with the capacitor C3. The capacitor C3 is connected with the resistor R8 in parallel. The capacitor C3 is connected in series with the resistor R10 and the diode D2. The resistor R8 is connected between the resistor R10 and the diode D2.

It should be understood, the AC power supply passes through the rectifier bridge BD1 for primary rectification, then passes through the filter capacitor EC2 for primary filtering, and then passes through the primary input terminal.

Specifically, in the embodiment, the primary input terminal Ti is connected with an input circuit. The input circuit is an input circuit of a conventional Primary-Side-Regulation (PSR) system, and includes an AC input, a primary rectifier and a primary filter connected successively. Then, the primary input power supply is provided to the transformer T2, a load to be charged is connected to the secondary output terminal To2, and the secondary output terminal To2 provides charging power supply to the load.

Furthermore, pin HV of the primary chip U3 is connected with the primary input terminal Ti of the transformer T2. The FB pin of a primary chip U3 is voltage divided and connected to the primary output terminal to1 of the transformer T2. The FB pin of the primary chip U3 is also successively connected with the resistor R11, the diode D3 and the filter capacitor EC3. The node between the diode D3 and the filter capacitor EC3 is also connected with the VCC pin of the primary chip U3.

It is understandable that the design that the HV pin of the primary chip U3 is connected to the primary input Ti of the transformer T2 to detect the input voltage of the primary coil of the transformer T2, so that the primary chip U3 can determine the input voltage, then adjust on-time of a built-in switch, adjust a switching frequency of the built-in switch at the same time, and adjust demagnetization time of the transformer T2 so as to achieve constant current output of the transformer T2.

By the design that the pin FB of the primary chip U3 is connected with the primary output terminal To1 of the transformer T2, the pin FB of the primary chip U3 detects output voltage of the transformer T2 according to an interact induction principle.

Furthermore, in the embodiment, the secondary coil of the transformer T2 is connected with a rectifier-filter unit configured to rectify and filter output current of the secondary coil of the transformer T2.

Additionally, the rectifier-filter unit can include a diode D1 connected to the secondary coil and configured to rectify the output current of the secondary coil. A positive pole of the diode D1 is connected to the filter capacitor EC1. The output current of the secondary coil is filtered by the filter capacitor EC1 and then is outputted.

It should be understood, the secondary coil of the transformer T2 is connected to the diode D1 to rectify the output current of the secondary coil, and the filter capacitor EC1 is connected after the diode D1 to filter rectified output current. Filtered output current is then outputted to the electronic equipment.

A work flow of the rectifier circuit 326 of the third embodiment is: obtain charging requirements of the load to be charged, control the transformer T2 to make the secondary output terminal To2 to output constant current or voltage according to the charging requirements, the constant current or voltage can be adjustable.

It should be understood, the rectifier circuit 326 of the third embodiment provides power to the main control circuit 322, the switch isolation control circuit 324, the switch control circuit 324, the temperature detection circuit 327, the display circuit 325, and the warning circuit 328.

Figure 28:
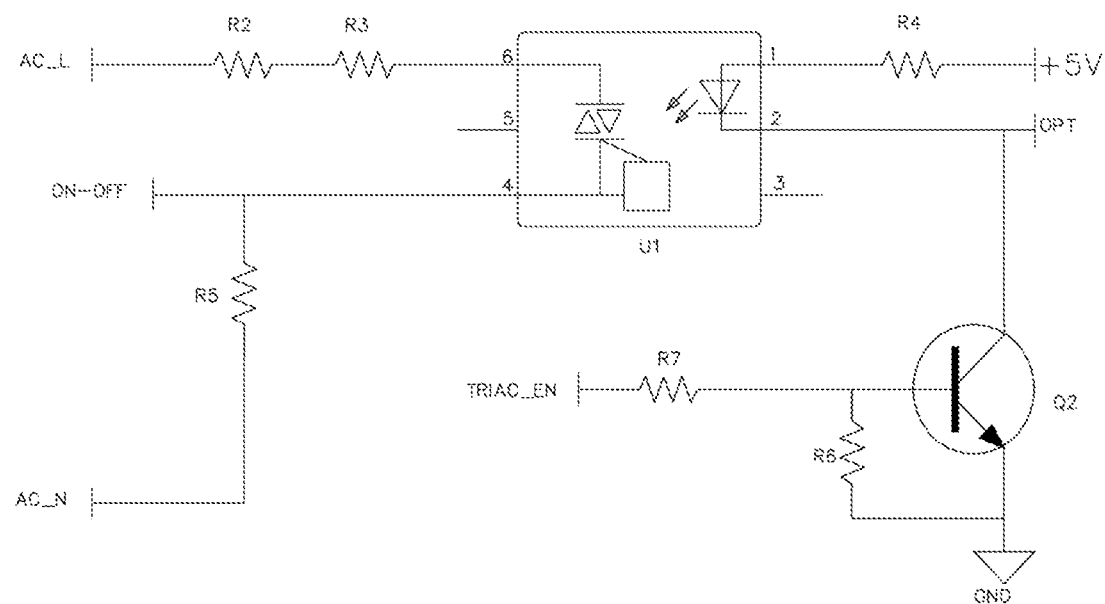
FIG. 28 is a schematic view showing principle of a switch isolation control circuit of the AC transmission circuit according to the third embodiment of the present disclosure.

Referring to FIGS. 24 and 28, the switch circuit 32 of the third embodiment further includes the switch isolation control circuit 324. The TRIAC 323 is connected to the main control circuit 322 through the switch isolation control circuit 324. The switch isolation control circuit 324 in this embodiment includes an optocoupler.

It should be understood, the main control circuit 322 in this embodiment is configured to control operations of the AC transmission circuit 3. By arranging the switch isolation control circuit 324, the main control circuit 322 can control the TRIAC 323 through the switch isolation control circuit 324, which can isolate the power supply circuit 31 and the main control circuit 322 so as to protect the main control circuit 322 from being damaged by the voltage surges in the power supply circuit, thereby prolonging service life of the AC transmission circuit 3. The design that the power supply circuit 31 and the main control circuit 322 is electrically isolated can avoid direct connection between high voltages and the main control circuit 322, which can further improve safety when users control on-off of the AC transmission circuit 1 artificially.

Additionally, when the TRIAC 323 is connected to high voltages, it is necessary to it is necessary to isolate the power supply circuit 31 and the main control circuit 322. The optocoupler of the present disclosure has a good isolation function. By setting the optocoupler, the optocoupler is used to directly isolate low voltage and high voltage of the power supply circuit 31 from the main control circuit 322. When the TRIAC 323 is connected to the high voltages, on-time of the TRIAC 323 (the duration during which the TRIAC 323 is turned on) can be controlled through the optocoupler, so as to isolate the high voltages of the TRIAC 323. Thus, the main control circuit 322 is safer and more reliable.

Specifically, the switch isolation control circuit 324 includes an optocoupler U1, a resistor R1, a resistor R2, a resistor R3, a resistor R4, a resistor R5, a resistor R6, a resistor R7, and a triode Q2.

The optocoupler U1 has six pins. A positive pole (that is pin 1) of a light emitter of the optocoupler U1 is connected to a 5V voltage through the resistor R4. The collector of the triode Q2 is coupled with a negative pole (that is pin 2) of the light emitter of the optocoupler U1. The emitter of the triode Q2 is connected to GND. The base of the triode Q2 is coupled to with the pin PA7 of the main control circuit U4 through the resistor R7. The resistor R7 is connected series with one terminal of the resistor R6, and the other terminal of the resistor R6 is connected to GND.

One terminal (pin 6) of a light receiver of the optocoupler U1 is coupled with the AC input through the resistor R3 and the resistor R4, the other terminal (pin 4) of the light receiver of the optocoupler U1 is connected with the TRIAC Q1 and the resistor R5. The resistor R5 and the TRIAC Q1 are connected in series. Pin 5 and pin 3 of the optocoupler U1 remains suspended.

It should be understood, a work process of the switch isolation control circuit 324 is as follow: the optocoupler U1 is MOC3041 and has a zero-crossing detection circuit. When corresponding current is inputted into the optocoupler U1, the voltage value between pin 6 and pin 4 of the optocoupler U1 slightly crosses zero, and the TRIAC inside the optocoupler U1 is turned on. When the main control chip U4 collects electrical signals that AC voltage crosses zero, it triggers the main control chip U4 to generate an event interrupt, which triggers the TRIAC Q1. Therefore, the TRIAC Q1 is turned on. When 0 mA current is inputted into the optocoupler U1, the TRIAC inside the optocoupler U1 is turned off. After the main control chip U4 receives signals that the TRIAC inside the optocoupler U1 is turned off, the main control chip U4 transmits off signal to the TRIAC Q1, so as to control the TRIAC Q1 to be turned off.

Figure 29:
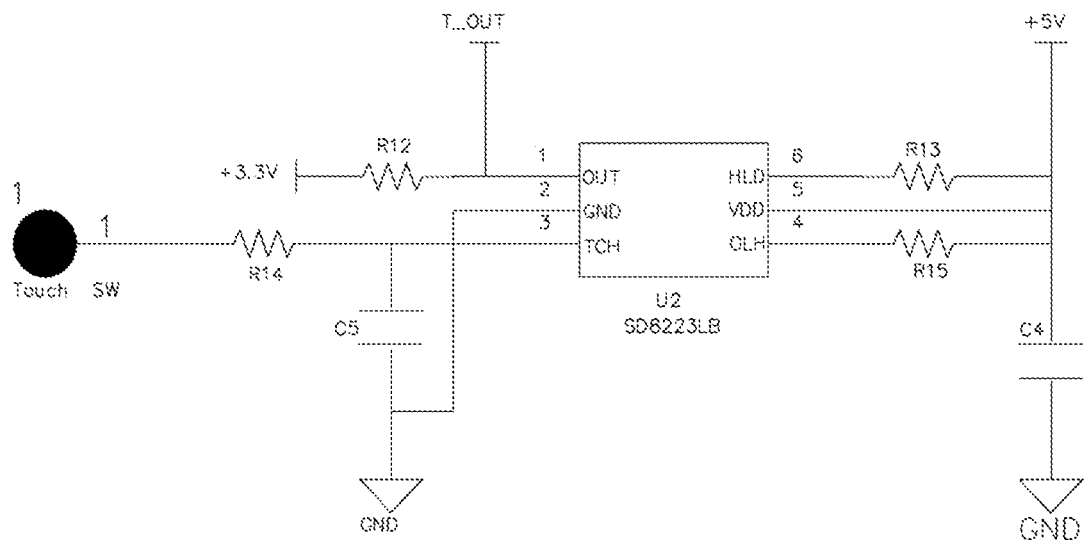
FIG. 29 is a schematic view showing principle of a switch control circuit of the AC transmission circuit according to the third embodiment of the present disclosure.

Referring to FIGS. 24 and 29, the switch circuit 32 of the third embodiment of the present disclosure further includes the switch control circuit 321 connected with the main control circuit 322. The main control circuit 322 controls on-off of the TRIAC 323 through the switch control circuit 321.

It should be understood, by arranging the switch control circuit 321, the main control circuit 322 controls on-off of the TRIAC 323 through the switch control circuit 321.

Optionally, the switch control circuit 321 may be but not limited to, a combination of one or more of a touch switch, a voice switch, a remote control switch and a push switch. Specifically, in the embodiment, the switch control circuit 321 is a touch switch.

It should be understood, the switch control circuit 321 of the third embodiment of the present disclosure controls on-off of the TRIAC 323 by a touch switch, which is convenient for controlling on-off the AC transmission circuit 3. In addition, comparing with conventional physical switches, the touch switch is safer and the service life thereof will be longer.

Specifically, the switch control circuit 321 includes a touch switch chip U2 having a model of SD8223 LB. Sd8223 lb is a touch and proximity sensing switch having a single key, which is used to replace a traditional mechanical switch. It has six pins. Further, the switch control circuit 321 of this embodiment also includes a peripheral circuit connected to the touch switch chip U2, and pin 1 of the touch switch chip U2 is connected with pin PA12 of the main control chip U4.

The peripheral circuit includes a resistor R12, a resistor R13, a resistor R14 and a resistor R15, a capacitor C4, and a capacitor C5. A pin 6 of the touch switch chip U2 is connected with a 5V voltage through the resistor R13. A pin 4 of the touch switch chip U2 is connected with one terminal of the resistor R15. The other terminal of the resistor R15 is connected in series with one terminal of the capacitor C4. The other terminal of the capacitor C4 is connected to GND. A pin 1 of the touch switch chip U1 is connected with a 3.3V voltage through the resistor R12. A pin 3 of the touch switch chip U2 is connected with the resistor R14 and the capacitor C5. The Capacitor C5 is connected to GND. A pin 2 of the touch switch chip U2 is connected to GND.

It should be understood, a work flow of the switch control circuit 321 of this embodiment is as follow: when the touch switch is touched or the proximity switch is approached, the switch control circuit 321 transmits corresponding signals to the main control chip U4 so as to control on-off of the TRIAC Q1.

Figure 30:
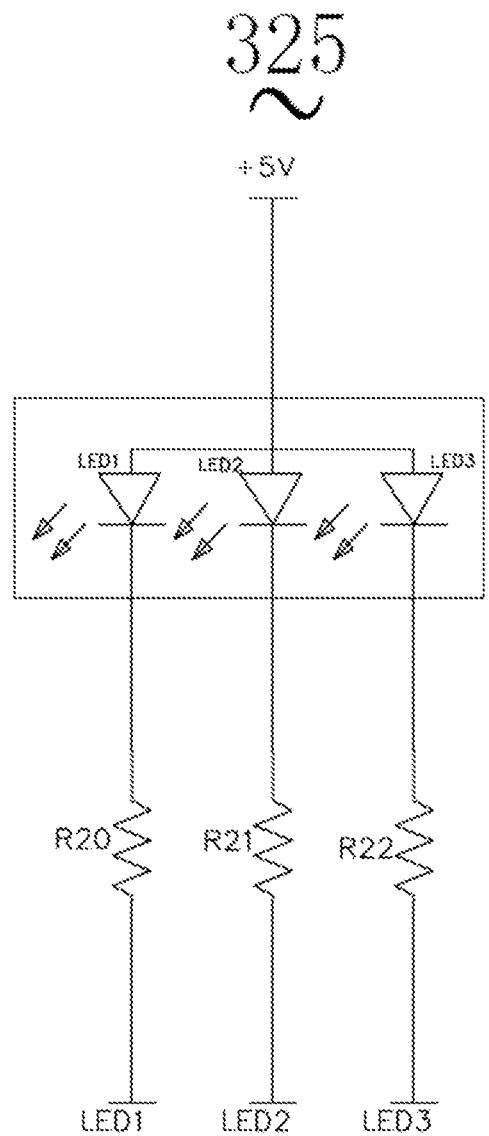
FIG. 30 is a schematic view showing principle of a display circuit of the AC transmission circuit according to the third embodiment of the present disclosure.

Referring to FIGS. 24 and 30, the switch circuit 32 further includes a display circuit 325 configured to display working modes and working states of the AC transmission circuit 3.

It should be understood, the display circuit 325 and the main control circuit 322 are connected. The main control circuit 322 controls the display circuit 325 to display working modes of the AC transmission circuit 3.

Specifically, the display circuit 325 includes a resistor R20, a resistor R21, a light emitting diode LED1, a light emitting diode LED2 and a light emitting diode LED3. One terminal of the light emitting diode LED1 is connected with a 5V voltage, and the other terminal of the light emitting diode LED2 is connected with pin PB1 of the main control chip U4 through the resistor R21. One terminal of the light emitting diode LED3 is connected with a 5V power, and the other terminal of the light emitting diode LED 3 is connected with pin PB2 of the main control chip U4.

It should be understood, when power supply is inputted into the display circuit 325, the 5V voltage forms a path through the resistors and then LEDs are lighted on.

It should be noted, lights of different colors can be used to indicate different operating modes of the AC transmission circuit 3. For example, a red light is used to indicate an abnormal state of the AC transmission circuit 3, at this time, the TRIAC 323 is abnormal. A green light is used to indicate a normal state of the AC transmission circuit 3, at this time, each component in the AC transmission circuit 3 is in a normal working state. A blue light is used to indicate that the AC transmission circuit 3 does not work, at this time, the AC transmission circuit 3 is in a closed state.

It should be understood, the display circuit 325 includes a display screen, which can be a combination of one or more of a LED screen, a CRT screen, or an OLED screen. The display circuit 325 is connected with the main control chip U4, which allows the display circuit 325 to timely display working information of the AC transmission circuit 3 collected by the main control chip U4. It should be noted, working information can be voltage, current, power, or their combination of the AC transmission circuit 3. Through such arrangements, voltages, current, powers or power consumption of the AC transmission circuit can be timely displayed on the display screen, which is convenient for users to obtain the working information of the AC transmission circuit 3.

Additionally, displayed power values can indicate current total power consumption of the AC transmission circuit. The display screen of the present disclosure shows the power value, so that users can understand power of an electric appliance and use the electric appliance within the allowable range. As for power consumption, watt hours can be displayed, which indicates power information of the electric appliance when users use the electric appliance for a long time. Furthermore, the power charge information can be preset. According to the power charge information and power consumption, real-time power charge can be displayed to tell the user that the power charge has been generated, so that the user can have an intuitive understanding of the power charge and remind the user to save power.

As stated above, when AC power supply is inputted, one part of which is transmitted to the power supply circuit 31. The power supply circuit 31 provides power to the main control circuit 32. The other part of the AC power supply is transmitted to a female socket so as to provide power to the female socket. The main control circuit 32 controls on-off of the power supply circuit 31 by controlling the TRIAC 323. The switch isolation control circuit 324 is configured to electrically isolate the power supply circuit 31 and the main control circuit 323. When the AC power supply is high voltage, it can avoid direct connection between the high voltage AC and the main control circuit 323. Furthermore, the switch isolation control circuit 324 further includes an optocoupler, which can provide further reliable isolation of the TRIAC 323. The power supply circuit 31 provides power to the main control circuit 323. The display circuit 325 is configured to display information collected by the main control circuit 323. The display circuit 325 display working modes or working states of the AC transmission circuit 3.

Figure 31:
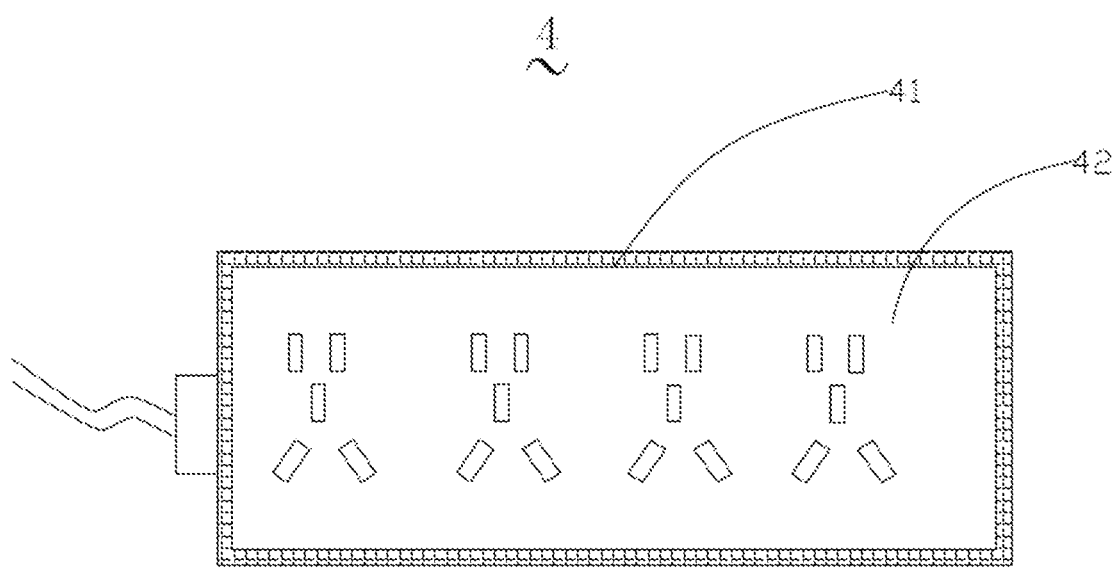
FIG. 31 is a schematic view of a socket according to a fourth embodiment of the present disclosure.

Referring to FIG. 31, a fourth embodiment of the present disclosure provides a socket 4 including a socket body 41 and a circuit structure 42 arranged in the socket body 41. The circuit structure 42 may be the AC transmission circuit 1 of the first embodiment, the AC transmission circuit 2 of the second embodiment, or the AC transmission circuit 3 of the third embodiment.

It should be understood, the socket 4 provided by the fourth embodiment of the present disclosure has same advantages with the AC transmission circuit 1 of the first embodiment, the AC transmission circuit 2 of the second embodiment, or the AC transmission circuit 3 of the third embodiment.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. An alternating current circuit, comprising:
   a power supply circuit;
   a switch circuit coupled with the power supply circuit;
   wherein the switch circuit comprises a main control circuit, a surge detection circuit, and a first switch device connected in series in the power supply circuit, the main control circuit is signal connected with the first switch device and configured to control on-off of the power supply circuit by controlling the first switch device; an input terminal of the surge detection circuit is connected with the power supply circuit, and an output terminal of the surge detection circuit is connected with the main control circuit; and
   wherein the first switch device comprises a TRIAC, the switch circuit further comprises a switch isolation control circuit, the TRIAC is connected with the main control circuit through the switch isolation control circuit.

2. The alternating current transmission circuit according to claim 1, wherein the surge detection circuit comprises a varistor, the varistor is connected to the power supply circuit and the main control circuit.

3. The alternating current transmission circuit according to claim 1, wherein the switch circuit further comprises an AC voltage detection circuit, the AC voltage detection circuit is connected to the power supply circuit and configured to detect voltages of the power supply circuit, an output terminal of the AC voltage detection circuit is connected with the main control circuit.

4. The alternating current transmission circuit according to claim 3, wherein input voltage of the power supply circuit is lower than a present voltage threshold, the main control circuit controls the first switch device to be turned on.

5. The alternating current transmission circuit according to claim 1, wherein the switch isolation control circuit comprises an optocoupler.

6. The alternating current transmission circuit according to claim 1, wherein the first switch device is a TRIAC, the main control circuit is signal connected with the first switch device and configured to control on-off of the power supply circuit through the first switch device;
   wherein the switch circuit further comprises a temperature detection circuit connected with the main control circuit and configured to detect temperature of the alternating current transmission circuit.

7. The alternating current transmission circuit according to claim 6, wherein the temperature detection circuit configured to detect temperature of the TRIAC and to feed back detected temperature to the main control circuit, the main control circuit controls on-off of the TRIAC according to the detected temperature.

8. The alternating current transmission circuit according to claim 7, wherein the main control circuit stores preset an overheat threshold, when the detected temperature is beyond the overheat threshold, the main control circuit controls the TRIAC to be turned off.

9. The alternating current transmission circuit according to claim 6, wherein the switch circuit further comprises a switch control circuit, the switch control circuit controls on-off of the TRIAC through the main control circuit, the switch control circuit is one or more of a touch switch, a voice switch, a remote control switch or a push switch.

10. The alternating current transmission circuit according to claim 6, wherein the switch circuit further comprises a display circuit connected with the main control circuit.

11. An alternating current transmission circuit, comprising:
a power supply circuit; and
a switch circuit coupled with the power supply circuit;
wherein the switch circuit comprises a main control circuit, a first switch device connected in series in the power supply circuit, and a snubber circuit connected in parallel with the first switch circuit; the main control circuit controls on-off of the power supply circuit by controlling on-off of the first switch device, the snubber circuit is configured to compensate current of the power supply circuit when the first switch device is turns off at zero-crossing; and
wherein the first switch device is one or more of a TRIAC, a relay, and a MOS transistor.

12. The alternating current transmission circuit according to claim 11, wherein the snubber circuit comprises a second switch device, one terminal of the second switch device is connected with the main control circuit, the other terminal of the second switch device is connected with the power supply circuit.

13. The alternating current transmission circuit according to claim 12, wherein the second switch device comprises a relay and a MOS transistor, the main control circuit is connected with the relay through the MOS transistor and controls on-off of the relay by controlling the MOS transistor.

14. The alternating current transmission circuit according to claim 11, wherein the alternating current transition circuit further comprises a voltage detection circuit configured to detect alternating current voltages and phases at an input terminal of the power supply circuit, an input terminal of the voltage detection circuit is connected with the power supply circuit, an output terminal of the voltage detection circuit is connected with the main control circuit.

15. The alternating current transmission circuit according to claim 14, wherein the voltage detection circuit comprises a transformer and a full bridge MOS circuit, a primary coil of the transformer is connected with the power supply circuit, a secondary coil of the transformer is connected with the main control circuit through the full bridge MOS circuit.

16. The alternating current transmission circuit according to claim 9, wherein the switch circuit further comprises a voltage-stabilizing circuit, an input terminal of the voltage-stabilizing circuit is connected with the power supply circuit, an output terminal of the voltage-stabilizing circuit is connected with the main control circuit and the snubber circuit.

17. A socket, comprising:
a socket body; and
a circuit structure arranged in the socket body;
Wherein the circuit structure comprises:
a power supply circuit;
a switch circuit coupled with the power supply circuit;
wherein the switch circuit comprises a main control circuit, a surge detection circuit, and a first switch device connected in series in the power supply circuit, the main control circuit is signal connected with the first switch device and configured to control on-off of the power supply circuit by controlling the first switch device; an input terminal of the surge detection circuit is connected with the power supply circuit, and an output terminal of the surge detection circuit is connected with the main control circuit, wherein the first switch device comprises a TRIAC, the switch circuit further comprises a switch isolation control circuit, the TRIAC is connected with the main control circuit through the switch isolation control circuit; or
the circuit structure comprises:
a power supply circuit;
a switch circuit coupled with the power supply circuit; and
wherein the switch circuit comprises a main control circuit, a first switch device connected in series in the power supply circuit, and a snubber circuit connected in parallel with the first switch circuit; the main control circuit controls on-off of the power supply circuit by controlling on-off of the first switch device, the snubber circuit is configured to compensate current of the power supply circuit when the first switch device is turns off at zero-crossing, wherein the first switch device is one or more of a TRIAC a relay, and a MOS transistor.

\* \* \* \* \*